(12) United States Patent
Toyohara et al.

(10) Patent No.: US 7,878,890 B2
(45) Date of Patent: Feb. 1, 2011

(54) GAME PROGRAM, GAME DEVICE, AND GAME METHOD

(75) Inventors: Koji Toyohara, Tokyo (JP); Akihiko Shimizu, Tokyo (JP); Yuichi Yokoyama, Tokyo (JP); Masafumi Yoshida, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 357 days.

(21) Appl. No.: 11/465,126

(22) Filed: Aug. 17, 2006

(65) Prior Publication Data

US 2006/0276241 A1 Dec. 7, 2006

Related U.S. Application Data

(63) Continuation of application No. PCT/JP2005/000285, filed on Jan. 13, 2005.

(30) Foreign Application Priority Data

Feb. 19, 2004 (JP) ............................. 2004-043616

(51) Int. Cl.
*A63F 9/24* (2006.01)
(52) U.S. Cl. ............................................. 463/3; 463/37
(58) Field of Classification Search .................. 463/3, 463/37
See application file for complete search history.

(56) References Cited

U.S. PATENT DOCUMENTS

| | | | |
|---|---|---|---|
| 3,749,514 A | | 7/1973 | Kelch et al. |
| 5,435,554 A | * | 7/1995 | Lipson ............................ 463/3 |
| 5,816,953 A | * | 10/1998 | Cleveland ..................... 473/459 |
| 6,120,374 A | * | 9/2000 | Akada et al. ..................... 463/3 |
| 6,217,444 B1 | * | 4/2001 | Kataoka et al. .................. 463/3 |
| 6,257,983 B1 | * | 7/2001 | Rimoto ......................... 463/38 |
| 6,394,894 B1 | * | 5/2002 | Okitsu et al. .................... 463/3 |

(Continued)

FOREIGN PATENT DOCUMENTS

JP 2000-084252 A 3/2000

(Continued)

OTHER PUBLICATIONS

EA Sports, "Tiger Woods PGA Tour 2004" Manuel, (Sep. 22, 2003), http://www.replacementdocs.com/e107_files/downloads/Tiger_Woods_PGA_Tour_2004_-_Manual_-_XBX.pdf , Entire Document (PDF sent with Office Action).*

(Continued)

*Primary Examiner*—Pierre E Elisca
(74) *Attorney, Agent, or Firm*—Global IP Counselors, LLP

(57) ABSTRACT

A first power property setting unit will set a first power property to a moving object. A power status display unit will display the power status of the moving object, which is defined based on the first power property, in an estimated passage position in an estimated passage display area. A rotational property setting unit will set a rotational property to the moving object which is dispatched from a character. A second power property setting unit will set a second power property to the moving object. A rotational status display unit will continuously display the rotational status of the moving object, which is defined based on the rotational property, in the estimated passage position.

9 Claims, 13 Drawing Sheets

U.S. PATENT DOCUMENTS

| | | | |
|---|---|---|---|
| 6,394,896 B2 * | 5/2002 | Sugimoto | 463/3 |
| 6,461,237 B1 * | 10/2002 | Yoshinobu et al. | 463/3 |
| 6,482,090 B1 * | 11/2002 | Rimoto et al. | 463/31 |
| 6,494,783 B2 * | 12/2002 | Namba et al. | 463/3 |
| 6,626,756 B2 * | 9/2003 | Sugimoto | 463/4 |
| 7,033,269 B2 * | 4/2006 | Namba et al. | 463/3 |
| 7,063,616 B2 * | 6/2006 | Kuri | 463/4 |
| 7,270,601 B2 * | 9/2007 | Takahashi et al. | 463/3 |
| 2002/0016194 A1 * | 2/2002 | Namba et al. | 463/3 |
| 2002/0016195 A1 * | 2/2002 | Namba et al. | 463/3 |
| 2002/0107058 A1 * | 8/2002 | Namba et al. | 463/3 |
| 2002/0177477 A1 * | 11/2002 | Okitsu et al. | 463/3 |
| 2003/0003977 A1 | 1/2003 | Takahashi et al. | |
| 2003/0017863 A1 * | 1/2003 | Takahashi et al. | 463/3 |
| 2003/0040349 A1 * | 2/2003 | Imaeda et al. | 463/3 |
| 2003/0078086 A1 | 4/2003 | Matsuyama et al. | |
| 2003/0190951 A1 * | 10/2003 | Matsumoto | 463/30 |
| 2005/0153764 A1 * | 7/2005 | Sterchi et al. | 463/3 |
| 2005/0202868 A1 * | 9/2005 | Sawano et al. | 463/30 |
| 2005/0215323 A1 * | 9/2005 | Miyamoto et al. | 463/43 |
| 2006/0068916 A1 * | 3/2006 | Hiranoya et al. | 463/42 |
| 2006/0276241 A1 * | 12/2006 | Toyohara et al. | 463/4 |
| 2007/0078004 A1 * | 4/2007 | Suzuki et al. | 463/43 |
| 2009/0325702 A1 * | 12/2009 | Koshima et al. | 463/37 |
| 2010/0053206 A1 * | 3/2010 | Ohnishi | 345/619 |

FOREIGN PATENT DOCUMENTS

| | | |
|---|---|---|
| JP | 2001-149657 A | 6/2001 |
| JP | 2003-85591 A | 3/2003 |
| KR | 2003-0003090 A | 1/2003 |
| KR | 2003-0033104 A | 4/2003 |
| TW | 120475 | 10/1989 |
| TW | 462898 B | 11/2001 |
| WO | WO-88/02156 | 3/1988 |
| WO | WO-01/52037 A2 | 7/2001 |

OTHER PUBLICATIONS

"Tiger Woods PGA Tour 2004 Gameplay Movie 4", (Sep. 23, 2003), http://www.gamespot.com/video/914791/6075686/tiger-woods-pga-tour-2004-gameplay-movie-4 , Entire Movie (No documentation sent with Office Action since reference is a video clip).*

"Perfect Play Professional Baseball", Konami Official Perfect Play Guide Book (Konami Official Perfect Play Series), Konami Corporation, Apr. 22, 2003, p. 12-p. 24.

"Jikkyo Powerful Pro Yakyu Premium-Ban Konami Koshiki Perfect Guide", 1st edition, Konami Co., Ltd., Mar. 6, 2006, pp. 5, 14 and 18.

Taketo Mizota, "Makyo no Ryutai Rikgaku Dai 1 Kai", Suri Kagaku, Saiensu-sha Co., Ltd., May 1, 1996, vol. 24, No. 5, pp. 83 to 90.

* cited by examiner

GAME PROGRAM, GAME DEVICE, AND GAME METHOD

CROSS-REFERENCE TO RELATED APPLICATIONS

This application is a continuation application of International Patent Application No. PCT/JP2005/000285 filed on Jan. 13, 2005, which claims priority to Japan Patent Application No. 2004-043616 filed on Feb. 19, 2004.

BACKGROUND OF THE INVENTION

1. Field of the Invention

The preset invention relates to a game program, particularly to a game program for implementing a game on a computer in which a character and a moving object are displayed on a monitor, and the moving object is dispatched by a character by means of a controller operation. Furthermore, the present invention relates to a game device and a game method implemented with this game program.

2. Background Information

Various games have been proposed in the past. One such game is a competitive video game, such as a baseball video game, wherein characters and moving objects are displayed on a monitor and a competitive sport is played. These types of baseball video games includes a video game in which a person playing the video game will operate the player characters on his or her own team with a controller and score points against another team, a game in which the game itself is primarily operated automatically and the video game player will enjoy the game from the position of a team manager, and the like. With the former game, the player characters of the video game player's team are configured to be able to hit and throw the ball when the team engages in offense and defense when the video game player operates the player characters of his or her own team with the controller. For example, when a player character is the pitcher, the video game player will cause the pitcher character to throw the ball to the catcher character by indicating the destination of the ball (the position of the catcher character's mitt) and the start of the throwing motion of the pitcher character with the controller. The velocity of the pitch thrown by the pitcher character is determined based on the pitcher character's ability in accordance with the type of pitch specified by the video game player, and the timing at which the video game player commands the pitcher character to throw the ball. Here, the type of pitch specified by the video game player is set by operation of the controller before the video game player commands the pitcher character to start a throwing motion. When a ball is thrown by the pitcher character, the ball trajectory is set in accordance with the type of pitch. Then, the estimated passage position of the ball will be displayed in an estimated passage display area that is set above the home plate in accordance with the ball's position in the ball trajectory, and is set to move in the estimated passage display area. The estimated passage position of the ball is displayed in the estimated passage display area with a cross-shape marking, for instance. This cross-shape marking moves in the estimated passage display area. The estimated passage display area corresponds to a hitting area in which the batter character hits the ball with a bat. The estimated passage position is used for predicting the position in which the ball approaching the estimated passage display area while moving in the ball trajectory will be hit by the bat. Note that the estimated passage display area includes the strike zone of the batter character, and if the ball that approaches the estimated passage display area has passed the strike zone, the pitch will be judged as a strike, and if the ball that approaches the estimated passage display area has not passed the strike zone, the pitch will be judged as a ball. See, for example, Perfect Play Professional Baseball, Konami Official Perfect Play Guide Book (Konami Official Perfect Play Series), Konami Corporation, Apr. 22, 2003, p. 12-p. 24.

In a conventional video game such as a baseball video game, if the pitcher character throws the ball, the estimated passage position of the ball will be displayed in the estimated passage display area that is set above the home plate with the cross-shape marking in accordance with the position of the ball in the ball trajectory, and this cross-shaped marking is set to move in the estimated passage display area. The video game player who operates the batter character will predict the position in which the ball will be hit by the bat in the estimated passage display area (i.e., the hitting area), while watching the movement of the estimated passage position displayed with the cross-shape marking. However, it has been difficult for a video game player to predict the subsequent direction of movement of the ball in advance by using only the cross-shape marking indicating the estimated passage position in the hitting area. In addition, the velocity of the ball thrown by the pitcher character will be determined in accordance with the pitcher character's ability and the timing in which the pitcher character releases the ball. However, it has been impossible for a video game player to grasp the velocity of the ball thrown by the pitcher character by using only the cross-shape marking indicating the estimated passage position in the hitting area.

In view of the above, it will be apparent to those skilled in the art from this disclosure that there exists a need for an improved game program, game device, and game method that will make it easy for a video game player to predict the direction of movement of a moving object in advance by using the estimated passage position of the moving object in an estimated passage display area, and will make it possible for a video game player to grasp the power of the moving object by using the estimated passage position of the moving object in the estimated passage display area. This invention addresses this need in the art as well as other needs, which will become apparent to those skilled in the art from this disclosure.

SUMMARY OF THE INVENTION

A game program according to a first aspect of the present invention will cause a computer to execute a game in which a character and a moving object are displayed in a monitor, and the moving object is dispatched from the character by operating a controller, the game program comprising:

(1) A passage area setting function for setting an estimated passage display area of the moving object in a predetermined position between the position from which the moving object is dispatched and the position at which the moving object arrives;

(2) A passage position setting function for setting an estimated passage position of the moving object in the estimated passage display area;

(3) A rotational property setting function for setting a rotational property of the moving object which is dispatched from the character;

(4) A trajectory setting function for setting a trajectory of the moving object between the position from which the moving object is dispatched and the position at which the moving object arrives based on the rotational property;

(5) A passage position moving function for moving the estimated passage position in the estimated passage display area in accordance with the position of the moving object in the trajectory; and (6) A rotational status display function for continuously displaying the rotational status of the moving object, which is defined based on the rotational property, in the estimated passage position which is moved in the estimated passage display area.

In the game achieved by this program, the estimated passage display area is set in a predetermined position between the position from which the moving object is dispatched and the position at which the moving object arrives by means of the passage area setting function. The estimated passage position of the moving object is set in the estimated passage display area by means of the passage position setting function. The rotational property is set to the moving object which is dispatched from the character by means of the rotational property setting function. The trajectory of the moving object is set between the position from which the moving object is dispatched and the position at which the moving object arrives based on the rotational property by means of the trajectory setting function. The estimated passage position is moved in the estimated passage display area in accordance with the position of the moving object in the trajectory by the passage position moving function. The rotational status of the moving object, which is defined based on the rotational property, is continuously displayed in the estimated passage position by the rotational status display function. Here, the estimated passage position is moved in the estimated passage display area.

Here, the rotational status of the moving object, which is defined based on the rotational property, is configured to be continuously displayed in the estimated passage position in the estimated passage display area. Because of this, a video game player can predict the direction in which the moving object will move in advance by watching the rotational status of the moving object continuously displayed in the estimated passage position. In other words, it will be easier for the video game player to predict the direction in which the moving object will move in advance by means of the estimated passage position in the estimated passage display area.

According to a game program in accordance with a second aspect of the present invention, in the game program according to the first aspect, the rotational property includes at least either of the rotational direction of the moving object and the rotational velocity of the moving object. In this case, the rotational property includes at least either of the rotational direction of the moving object and the rotational velocity of the moving object. Therefore, the video game player can predict the direction in which the moving object will move in advance by watching the rotational status of the moving object, which is defined based on the rotational property, i.e., the rotational status of the moving object, which is defined based on the rotational direction of the moving object and the rotational velocity of the moving object.

According to a game program in accordance with a third aspect of the present invention, in the game program according to the first or second aspects, the rotational status display function displays the moving object rotating and changing by continuously piecing together a plurality of time-series image data of the moving object. In this case, the rotational status display function is configured to display the moving object rotating and changing by continuously piecing together the plurality of time-series image data of the moving object. Therefore, the rotational status of the moving object can be displayed as a motion picture in the estimated passage position. Because of this, it will be easier for the video game player to grasp the rotational status of the moving object, and thus it will be easier for him/her to predict the direction in which the moving object moves in advance.

A game program in accordance with a fourth aspect of the present invention will cause a computer to execute a game in which a character and a moving object are displayed in a monitor, and the moving object is dispatched from the character by operating a controller, the game program comprising:

(1) A passage area setting function for setting an estimated passage display area of the moving object in a predetermined position between the position from which the moving object is dispatched and the position at which the moving object arrives;

(2) A passage position setting function for setting an estimated passage position of the moving object in the estimated passage display area;

(3) A first power property setting function for setting a first power property to the moving object that is set in accordance with the timing at which the moving object is dispatched from the character; and (4) A power status display function for displaying the power status of the moving object, which is defined based on the first power property, in the estimated passage position in the estimated passage display area.

In the game achieved by this program, the estimated passage display area is set in a predetermined position between the position from which the moving object is dispatched and the position at which the moving object arrives by means of the passage area setting function. The estimated passage position of the moving object is set in the estimated passage display area by means of the passage position setting function. The first power property is set to the moving object by means of the first power property setting function. This first power property is set in accordance with the timing at which the moving object is dispatched from the character. The power status of the moving object, which is defined based on the first power property, is displayed in the estimated passage position in the estimated passage display area by means of the power status display function.

Here, the first power property is set to the moving object, and the power status of the moving object, which is defined based on the first power property, is displayed in the estimated passage position in the estimated passage display area. Accordingly, the video game player can grasp the power of the moving object in advance by means of watching the power status of the moving object which is defined based on the first power property. In other words, the video game player can grasp the power of the moving object by means of the estimated passage position in the estimated passage display area.

According to the game program in accordance with a fifth aspect of the present invention, in the game program according to the fourth aspect, the first power property includes the acceleration of the moving object between the position from which the moving object is dispatched and the position at which the moving object arrives. In this case, the first power property includes the acceleration of the moving object. Therefore, the video game player can grasp the power of the moving object in advance by watching the power status of the moving object that is defined based on the first power property, that is, the power status of the moving object that is defined based on the acceleration.

According to the game program in accordance with a sixth aspect of the present invention, in the game program according to the fourth or fifth aspects of the present invention, the power status display function expresses the power status of the moving object in the estimated passage position with the size of the moving object. In this case, the power status of the moving object is expressed with the size of the moving object in the estimated passage position. Therefore, the video game player can grasp the power of the moving object in advance based on the size difference of the moving object displayed in the estimated passage position. For example, if the power of the moving object is large, the size of the moving object will be displayed to be small, whereas if the power of the moving object is small, the size of the moving object will be displayed to be large. Thus, the video game player can determined the extent of the power of the moving object.

According to the game program in accordance a seventh aspect of the present invention, the game program according to any one of the fourth to sixth aspects further comprises:

(1) A rotational property setting function for setting a rotational property to the moving object which is dispatched from the character;

(2) A second power property setting function for setting a second power property to the moving object in accordance with the timing at which the moving object is dispatched from the character;

(3) A trajectory setting function for setting the trajectory of the moving object between the position from which the moving object is dispatched and the position at which the moving object arrives based on the second power property and the rotational property;

(4) A passage position moving function for moving the estimated passage position in the estimated passage display area in accordance with the position of the moving object in the trajectory; and (5) A rotational status display function for continuously displaying the rotational status of the moving object, which is defined based on the rotational property, in the estimated passage position that is moved in the estimated passage display area.

In a game achieved by this program, the rotational property is set to the moving object that is dispatched from the character by the rotational property setting function. The second power property is set to the moving object by the second power property setting function. This second power property is set in accordance with the timing in which the moving object is dispatched from the character. The trajectory of the moving object is set between the position from which the moving object is dispatched and the position at which the moving object arrives based on the second power property and the rotational property by means of the trajectory setting function. The estimated passage position is moved in the estimated passage display area in accordance with the position of the moving object in the trajectory by means of the passage position moving function. The rotational status of the moving object, which is defined based on the rotational property, is continuously displayed in the estimated passage position by means of the rotational status display function. Here, the estimated passage position is moved in the estimated passage display area.

Here, the trajectory of the moving object is set based on the second power property and the rotational property. In addition, the estimated passage position is moved in the estimated passage display area in accordance with the position of the moving object in the trajectory, and the rotational status of the moving object, which is defined based on the rotational property, is continuously displayed in the estimated passage position.

Accordingly, the video game player can predict the trajectory of the moving object in advance by watching the power status of the moving object defined based on the second power property. Furthermore, a video game player can predict the direction in which the moving object will move in advance by watching the rotational status of the moving object continuously displayed in the estimated passage position. In other words, it will be easier for the video game player to predict the direction in which the moving object will move in advance by means of the estimated passage position in the estimated passage display area.

According to a game program in accordance with an eighth aspect of the present invention, in the game program according to the seventh aspect, the rotational property includes at least either the rotational direction of the moving object and the rotational velocity of the moving object. In this case, the rotational property includes at least either the rotational direction of the moving object and the rotational velocity of the moving object. Therefore, the video game player can predict the direction in which the moving object will move in advance by watching the rotational status of the moving object, which is defined based on the rotational property, i.e., the rotational status of the moving object, which is defined based on at least either of the rotational direction of the moving object and the rotational velocity of the moving object.

According to the game program in accordance with a ninth aspect of the present invention, in the game program according to a seventh or eighth aspect, the second power property includes a trajectory change rate which indicates the extent to which the trajectory of the moving object is changed. In this case, the second power property includes the trajectory change rate. Therefore, the video game player can predict the change in the trajectory of the moving object by watching the power status of the moving object. For example, if the power of the moving object is large, the trajectory of the moving object will suddenly change, whereas if the power of the moving object is small, the trajectory of the moving object will gradually change. Accordingly, the video game player can predict if the trajectory of the moving object will suddenly change or gradually change in advance based on the extent of the power of the moving object.

According to a game program in accordance with a tenth aspect of a present invention, in the game according to any one of the seventh to ninth aspects, the rotational status display function will display the moving object rotating and changing by continuously piecing together a plurality of time-series image data of the moving object. In this case, the rotational status display function will display the condition in which the moving object rotates and changes by continuously piecing together the plurality of time-series image data of the moving object. Therefore, the rotational status of the moving object can be displayed as a motion picture in the estimated passage position. Because of this, it will be easier for the video game player to grasp the rotational status of the moving object and thus it will be easier for him/her to predict the direction in which the moving object will move in advance.

According to a game device in accordance with an eleventh aspect of the present invention, the game device in which a character and a moving object are displayed on a monitor, and the moving object is dispatched from the character by operating a controller, includes passage area setting means, passage position setting means, rotational property setting means, trajectory setting means, passage position moving means, and rotational status display means. The estimated passage display area of the moving object is set to a predetermined position between the position from which the moving object is dispatched and the position at which the moving object arrives by means of the passage area setting means. The estimated passage position of the moving object is set in the estimated passage display area by means of the passage position setting means. The rotational property is set to the moving object which is dispatched from the character by means of the rotational property setting means. The trajectory of the moving object is set between the position from which the moving object is dispatched and the position at which the moving object arrives based on the rotational property by means of the trajectory setting means. The estimated passage position is moved in the estimated passage display area in accordance with the position of the moving object in the trajectory by means of the passage position moving means. The rotational status of the moving object, which is defined based on the rotational property, is continuously displayed in the estimated passage position that is moved in the estimated passage display area by means of the rotational status display means.

According to a game device in accordance with a twelfth aspect of the present invention, the game device in which a character and a moving object are displayed in a monitor and the moving object is dispatched from the character by operating a controller includes passage area setting means, passage position setting means, first power property setting means, and power status display means. The estimated passage display area of the moving object is set to a predetermined position between the position from which the moving object is dispatched and the position at which the moving object arrives by means of the passage area setting means. The estimated passage position of the moving object is set in the estimated passage display area by means of the passage position setting means. The first power property of the moving object, which is set in accordance with the timing at which the moving object is dispatched from the character, is set to the moving object by means of the first power property setting means. The power status of the moving object, which is defined based on the first power property, is displayed in the estimated passage position in the estimated passage display area by means of the power status display means.

According to a game device in accordance with a thirteenth aspect of the present invention, the game device according to the twelfth aspect further includes rotational property setting means, second power property setting means, trajectory setting means, passage position moving means, and rotational status display means. The rotational property is set to the moving object which is dispatched from the character by means of the rotational property setting means. The second power property of the moving object, which is set in accordance with the timing at which the moving object is dispatched from the character, is set to the moving object by the second power property setting means. The trajectory of the moving object is set between the position from which the moving object is dispatched and the position at which the moving object arrives based on the second power property and the rotational property by the trajectory setting means. The estimated passage position is moved in the estimated passage display area in accordance with the position of the moving object in the trajectory by means of the passage position moving means. The rotational status of the moving object, which is defined based on the rotational property, is continuously displayed in the estimated passage position that is moved in the estimated passage display area by means of the rotational status display means.

According to a game method in accordance with a fourteenth aspect of the present invention, a game method in which a character and a moving object are displayed in a monitor, and the moving object is dispatched from the character by operating a controller, includes a passage area setting step, a passage position setting step, a rotational property setting step, a trajectory setting step, a passage position moving step, and a rotational status display step. The estimated passage display area of the moving object is set to a predetermined position between the position from which the moving object is dispatched and the position at which the moving object arrives in the passage area setting step. The estimated passage position of the moving object is set in the estimated passage display area in the passage position setting step. The rotational property is set to the moving object which is dispatched from the character in the rotational property setting step. The trajectory of the moving object is set between the position from which the moving object is dispatched and the position at which the moving object arrives based on the rotational property in the trajectory setting step. The estimated passage position is moved in the estimated passage display area in accordance with the position of the moving object in the trajectory in the passage position moving step. The rotational status of the moving object, which is defined based on the rotational property, is continuously displayed in the estimated passage position that is moved in the estimated passage display area in the rotational status display step.

According to a game method in accordance with a fifteenth aspect of the present invention, a game method in which a character and a moving object are displayed in a monitor and the moving object is dispatched from the character by operating a controller includes a passage area setting step, a passage position setting step, a first power property setting step, and a power status display step. The estimated passage display area of the moving object is set to a predetermined position between the position from which the moving object is dispatched and the position at which the moving object arrives in the passage area setting step. The first power property of the moving object, which is set in accordance with the timing at which the moving object is dispatched from the character, is set to the moving object in the first power property setting step. The power status of the moving object, which is defined based on the first power property, is displayed in the estimated passage position in the estimated passage display area in the power status display step.

According to a game method in accordance with a sixteenth aspect of the present invention, the game method according to the fifteenth aspect further includes a rotational property setting step, a second power property setting step, a trajectory setting step, a passage position moving step, and a rotational status display step. The rotational property is set to the moving object which is dispatched from the character in the rotational property setting step. The second power property of the moving object, which is set in accordance with the timing at which the moving object is dispatched from the character, is set to the moving object in the second power property setting step. The trajectory of the moving object is set between the position from which the moving object is dispatched and the position at which the moving object arrives based on the second power property and the rotational property by means of the trajectory setting function. The estimated passage position is moved in the estimated passage display area in accordance with the position of the moving object in the trajectory in the passage position moving step. The rotational status of the moving object, which is defined based on the rotational property, is continuously displayed in the estimated passage position that is moved in the estimated passage display area in the rotational status display step.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration and Operation of Game Device

Figure 1:
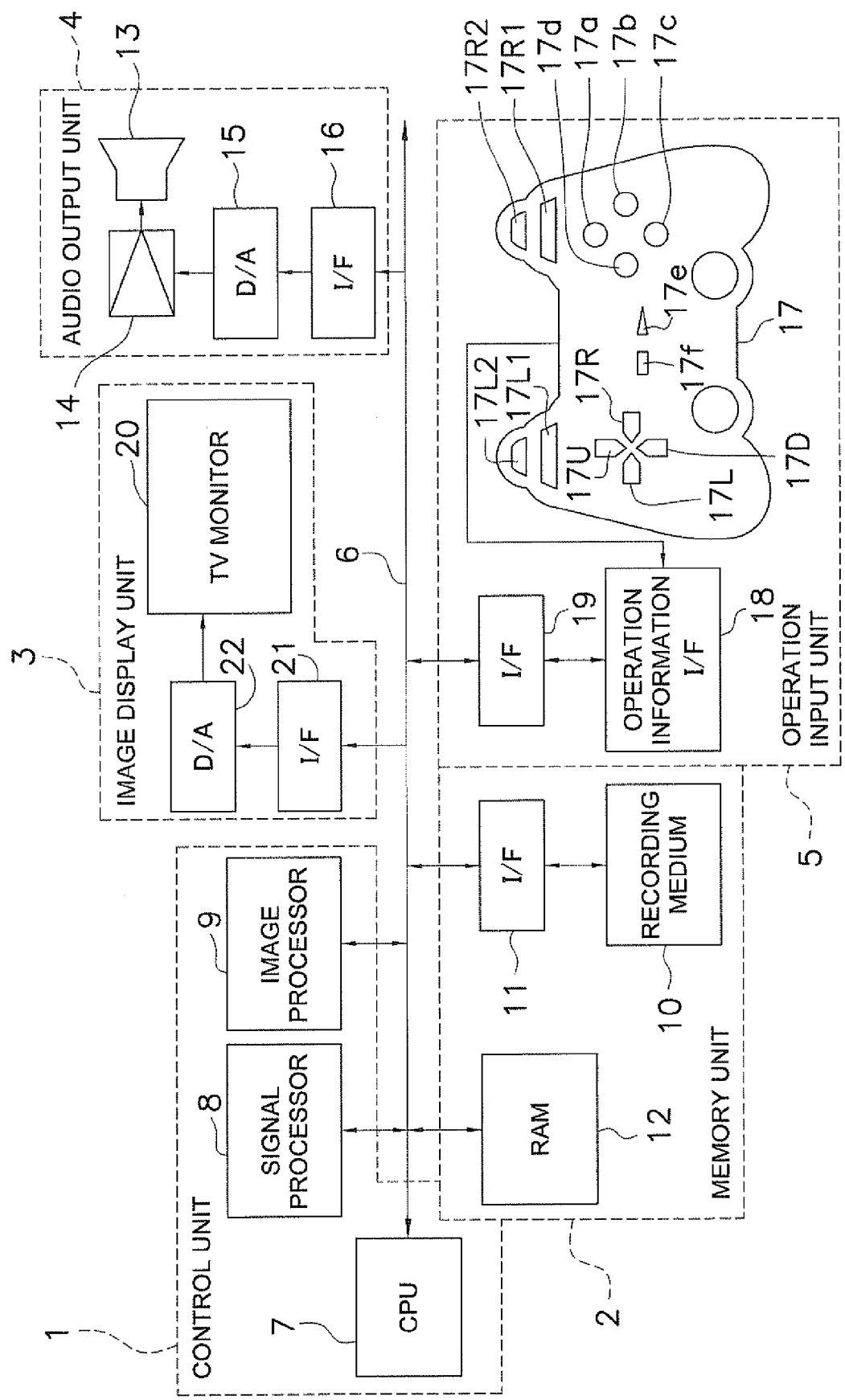
FIG. 1 is a basic block diagram of a game device in accordance with an embodiment of the present invention.

FIG. 1 shows the basic configuration of a game device in accordance with an embodiment of the present invention. As an example of the video game device, a home video game device will be hereinafter described. The home video game device comprises a home video game console and a home television set. A recording medium 10 can be loaded in the home video game console. Game data is arbitrarily read out of the recording medium 10 and a game is executed. The content of the game executed herewith is displayed on the home television set.

The game system of the home video game device is comprised of a control unit 1, a memory unit 2, an image display unit 3, an audio output unit 4, an operation input unit 5, and each of these units is connected to each other through a bus 6. This bus 6 includes an address bus, a data bus, a control bus, and the like. Here, the control unit 1, the memory unit 2, the audio output unit 4, and the operation input unit 5 are included in the home video game console of the home video game device, and the image display unit 3 is included in the home television set.

The control unit 1 primarily controls the progress of the overall game based on the game program. The control unit 1 is comprised of a CPU (Central Processing Unit) 7, a signal processor 8, and an image processor 9, for instance. The CPU 7, the signal processor 8, the image processor 9 are connected to each other through the bus 6. The CPU 7 interprets commands from the game program and performs various types of data processing and data control. For example, the CPU 7 commands the signal processor 8 to provide the image data for the image processor. The signal processor 8 primarily performs computations in three-dimensional space, position conversion computations from the three-dimensional space to a virtual three-dimensional space, light source computation processing, and data generation and processing of image and audio data. The image processor 9 primarily writes image data to be rendered to a RAM 12 based on the computation results and processing results of the signal processor 8.

The memory unit 2 primarily stores the program data, various types of data used for the program data, and the like. The memory unit 2 is comprised of the recording medium 10, an interface circuit 11, and the RAM (Random Access Memory) 12, for instance. The interface circuitry 11 is connected to the recording medium 10. The interface circuitry 11 and the RAM 12 are then connected through the bus 6. The recording medium 10 stores program data for the operation system, game data comprised of image data, audio data, and various types of program data, and the like. For example, this recording medium 10 is a ROM (Read Only Memory) cassette, an optical disk, a flexible disk, or the like. The program data for the operating system, the game data, and the like are stored on this recording medium 10. Note that a card memory is also regarded as a recording medium 10, and primarily used for storing various game parameters at the point when the game is interrupted. The RAM 12 is used for temporarily storing various types of data read out of the recording medium 10, and for temporarily recording the processing results from the control unit 1. In addition to various types of data, address data indicating the memory location of various types of data is stored in this RAM 12, and it is also possible to specify an arbitrary address and read and write data from/to the address.

The image display unit 3 primarily outputs the image data written to the RAM 12 by the image processor 9, the image data read out of the recording medium 10, and the like, as an image. This image display unit 3 is comprised of a television monitor 20, an interface circuit 21, a D/A converter (Digital-to-Analog converter) 22, for instance. The D/A converter 22 is connected to the television monitor 20, and the interface circuit 21 is connected to the D/A converter 22. In addition, the bus 6 is connected to the interface circuit 21. Here, the image data is provided for the D/A converter 22 through the interface circuit 21, and is converted into an analog image signal. Then, the analog image signal is output to the television monitor 20 as an image.

Here, the image data includes polygon data, texture data, and the like, for instance. The polygon data is coordinate data for the apexes comprising the polygon. The texture data is used for setting the texture of the polygon, and is comprised of texture specifying data and texture color data. The texture specifying data is data for associating the polygon and the texture, and the texture color data is data for specifying the texture color. Here, polygon address data and texture address data, both of which indicate the memory location of each type of data, are associated with the polygon data and the texture data, respectively. With this image data, a coordinate conversion and a perspective projection conversion are performed with respect to the polygon data in the three-dimensional space (i.e., the three-dimensional polygon data) indicating the polygon address data by the signal processor 8, based on the displacement data and the rotational data of the screen itself (i.e., the point of view). Accordingly, the polygon data is converted into polygon data in two-dimensional space (i.e., two-dimensional polygon data). Then, a polygon outline is formed with a plurality of two-dimensional polygon data, and texture data specified by the texture address data is written to the internal area of the polygon. Thus, objects made by applying texture to each polygon, that is, various characters, can be expressed.

The audio output unit 4 primarily outputs the audio data read out of the recording medium 10 as audio. The audio output unit 4 is comprised of a speaker 13, an amplifier circuit 14, a D/A converter 15, and an interface circuit 16, for instance. The amplifier circuit 14 is connected to the speaker 13. The D/A converter 15 is connected to the amplifier circuit 14. The interface circuit 16 is connected to the D/A converter 15. In addition, the bus 6 is connected to the interface circuit 16. Here, the audio data is provided for the D/A converter 15 through the interface circuit 16 and is converted into an analog audio signal. The analog audio signal is amplified by the amplifier circuit 14 and output as audio by the speaker 13. ADPCM (Adaptive Differential Pulse Code Modulation) data, PCM (Pulse Code Modulation) data, and the like are included in the category of audio data, for instance. In the case of the ADPCM data, the audio can be output by the speaker 13 with the same type of processing method as described above. In the case of the PCM data, if the PCM data is converted to the ADPCM data in the RAM 12, the audio can be output by the speaker 13 with the same type of processing method as described above.

The operation input unit 5 is mainly comprised of a controller 17, an operation information interface circuit 18, and an interface circuit 19. The operation information interface circuit 18 is connected to the controller 17, and the interface circuit 19 is connected to the operation information interface circuit 18. In addition, the bus 6 is connected to the interface circuit 19.

The controller 17 is an operation unit used for the input of various operation commands by the video game player, and transmits operation signals to the CPU 7 in accordance with a video game player's operation. A first button 17a, a second button 17b, a third button 17c, a fourth button 17d, an up key 17U, a down key 17D, a left key 17L, a right key 17R, a L1 button 17L1, a L2 button 17L2, a R1 button 17R1, a R2 button 17R2, a start button 17e, a select button 17f, a left stick 17SL, and a right stick 17SR are provided with the controller 17.

The up key 17U, the down key 17D, the left key 17L, and the right key 17R are used for providing the CPU 7 with a command to cause the characters and a cursor to move up, down, left, and right on the screen of the television monitor 20, for instance.

The start button 17e is used for commanding the CPU 7 to load the game program from the recording medium 10, and the like.

The select button 17f is used for commanding the CPU 7 to execute various selections with respect to the game program loaded from the recording medium 10, for instance.

The left stick 17SL and the right stick 17SR are stick-shaped controllers with approximately the same constitution as a so-called joystick. This stick-shaped controller includes a upright stick. This stick is configured so as to incline from the upright position to 360-degree directions including front, back, left, and right directions, centered around the fulcrum. The left stick 17SL and the right stick 17SR transmit x and y coordinate values with the origin being the upright position as the operation signal to the CPU 7 through the operation information interface circuit 18 and the interface circuit 19 in accordance with the direction and angle of incline of the stick.

Various functions are allocated to the first button 17a, the second button 17b, the third button 17c, the fourth button 17d, the L1 button 17L1, the L2 button 17L2, the R1 button 17R1, and the R2 button 17R2 in accordance with the game program that is loaded from the recording medium 10.

Note that each button and each key provided for the controller 17 other than the left stick 17SL and the right stick 17SR are configured to function as ON/OFF switches which will place the home video game device in an on-state when pressed from the neutral position by means of external pressure and place the device in an off-state when the pressure is released and the button or key returns to the neutral position.

The general operation of the home video game device configured as described above will be hereinafter explained. If a power switch (not shown in the figure) is turned on and the game system 1 is powered on, the CPU 7 reads out image data, audio data, and program data from the recording medium 10 based on the operating system stored in the recording medium 10. All or a portion of the read-out data including the image data, the audio data, and the program data is stored in the RAM 12. Then, the CPU 7 will issue commands for the image data and the audio data, both of which are stored in the RAM 12, based on the program data stored in the RAM 12.

In the case of image data, the signal processor 8 first performs a positional computation, a light source computation, and the like for the character in the three-dimensional space based on the command from the CPU 7. Next, the image processor 9 performs a process of writing the image data to be rendered to the RAM 12 based on the computation results by the signal processor 8. Then, the image data written to the RAM 12 is provided to the D/A converter 17 through the interface circuit 13. Here, the image data is converted into an analog image signal with the D/A converter 17. Then, the image data is provided to the television monitor 20 and displayed as images.

In the case of the audio data, the signal processor 8 first performs a process to generate and process audio data based on a command from the CPU 7. Here, processing, such as pitch conversion, noise addition, envelope setting, level setting, and reverb addition, is performed for the audio data. Next, the audio data is output from the signal processor 8 and provided for the D/A converter 15 through the interface circuit 16. Here, the audio data is converted into an analog audio signal. Then, the audio data is output as audio by the speaker 13 through the amplifier circuit 14.

Various Means in the Game Device

Figure 2:
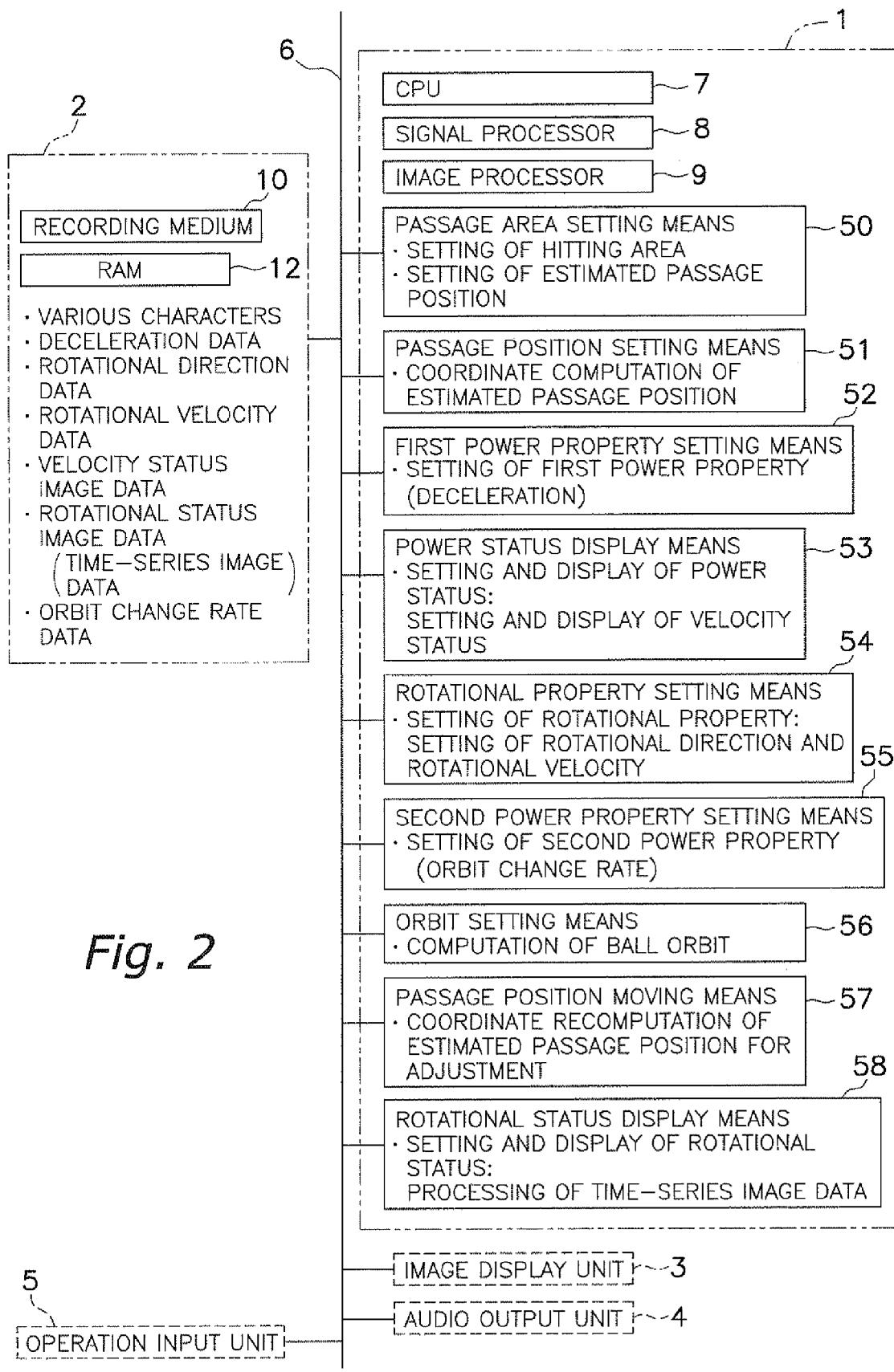
FIG. 2 is a functional block diagram for describing a means primarily controlled by a control unit shown in FIG. 1.

The game executed in the present game device is a baseball video game, for instance. FIG. 2 is a functional block diagram for describing the means controlled by the control unit 1 shown in FIG. 1. Various means in the baseball vide game, which play a main role in the present invention, will be explained in reference to the functional block diagram.

The baseball game device is a game device in which a pitcher character 30, a catcher character 31, a batter character 32, and a ball 33 are displayed on the television monitor 20 included in the image display unit 3, and the ball 33 is dispatched from the pitcher character 30 by operation of the controller 17 included in the operation input unit 5 (see FIGS. 4 to 11), and comprises passage area setting means 50, passage position setting means 51, first power property setting means 52, velocity status display means 53, rotational property setting means 54, second power property setting means 55, trajectory setting means 56, passage position moving means 57, and rotational status display means 58.

The passage area setting means 50 is a means for achieving the function of setting an estimated passage display area in a predetermined position between the position from which the ball is dispatched and the position at which the ball arrives. The passage area setting means 50 in the control unit 1 computes the estimated passage display area (e.g., a hitting area 40), that is, the coordinate of the predetermined position (e.g., the position coordinate of a home plate 35) between the position from which the ball 33 is dispatched and the position at which the ball 33 arrives, based on the coordinate of the position from which the ball 33 is dispatched and the coordinate of the position at which the ball 33 arrives. The coordinate of the position from which the ball 33 is dispatched is the coordinate of the position of the pitcher character 30, and the coordinate of the position at which the ball 33 arrives is the coordinate of the position of the catcher character 31.

Based on the position coordinate of the home plate 35, the control unit 1 sets the position of the hitting area 40 to be above the home plate 35. Here, the hitting area 40 means the area in which the batter character 32 hits the ball 33 with a bat 32a. The control unit 1 sets a strike zone 41 for the batter character in this hitting area 40.

The passage position setting means 51 is a means for achieving the function of setting an estimated passage position of the moving object in the estimated passage display area. The passage position setting means 51 computes the intersection coordinate in which the hitting area 40 intersects with a straight line passing the position coordinate in which the ball 33 is dispatched from the pitcher character 30 and the position coordinate in which the ball 33 arrives at the catcher character 31. This intersection coordinate is set to be in the hitting area 40 as an estimated passage position 60 by the control unit 1.

The first power property setting means 52 is a means for achieving the function of setting a first power property of the ball 33, which is set in accordance with the timing at which the ball 33 is dispatched from the pitcher character 30. The first power property changes the velocity of the ball 33 between the position from which the ball 33 is dispatched and the position at which the ball 33 arrives. The first power property includes acceleration that accelerates the ball 33 from the position from which the ball 33 is dispatched to the position at which the ball 33 arrives. Here, the first power property includes deceleration (i.e., negative acceleration) data that decelerates the ball 33 from the position from which the ball 33 is dispatched to the position at which the ball 33 arrives. The timing at which the ball 33 is dispatched from the pitcher character 30 is determined when the control unit 1 identifies a ball release request from the operation input unit 5. The first power property (e.g., the deceleration data of the ball 33) is read out of the memory unit 2 by the control unit 1 in accordance with the timing at which the control unit 1 recognizes the ball release demand, and the first power property setting means 52 sets the deceleration of the ball 33.

The power status display means 53 is a means for achieving the function of displaying the power status of the ball that is defined based on the power property of the ball in the estimated passage position in the estimated passage display area. The power status display means 53 expresses the power status of the ball with the size of the ball in the estimated passage position. The power status display means 53 in the control unit 1 sets the power status, such as a velocity status, to the ball 33 based on the power property of the ball. Then, if the power status such as the velocity status is set to the ball 33 by the control unit 1, the control unit 1 issues a power display demand to the image display unit 3, and a velocity mark 61 that corresponds to the velocity status is displayed in the estimated passage display area (e.g., the estimated passage position 60 in the hitting area 40) on the television monitor 20. Here, the velocity mark 61, which corresponds to the velocity status displayed in the estimated passage position 60 in the hitting area 40, is expressed with the size of the ball in the estimated passage position 60, and is displayed on the television monitor 20.

The rotational property setting means 54 is a means for achieving the function of setting a rotational property to the ball 33 which is dispatched from the pitcher character 30. The rotational property includes the rotational direction and the rotational velocity of the ball 33 (see FIG. 12). If the control unit 1 identifies a rotational property instruction request from the operation input unit 5, the rotational property setting means 54 in the control unit 1 will set the rotational property to the ball 33 that is dispatched from the pitcher character 30. Here, the control unit 1 reads out the rotational direction data 70 and the rotational velocity data 71 of the ball 33 from the memory unit 2. Then, the control unit 1 sets the rotational property based on the rotational direction data 70 and the rotational velocity data 71 to the ball 33.

The second power property setting means 55 is a means for achieving the function of setting a second power property of the ball 33 which is set in accordance with the timing at which the ball 33 is dispatched from the pitcher character 30 to the ball 33. The second power property changes the trajectory of the ball 33 between the position from which the ball 33 is dispatched and the position at which the ball 33 arrives. The second power property includes the trajectory change rate indicating the degree in which the trajectory of the ball 33 is changed. The timing in which the ball 33 is dispatched from the pitcher character 30 is determined when the control unit 1 identifies a ball release request from the operation input unit 5. The second power property setting means 55 in the control unit 1 reads out the second power property of the ball 33 (e.g., the trajectory change rate data of the ball 33) from the memory unit 2 in accordance with the timing at which the control unit 1 recognizes the ball release request. Then, the control unit 1 sets the trajectory change rate of the ball to the ball 33.

The trajectory setting means 56 is a means for achieving the function of setting the trajectory of the ball 33 between the position from which the ball 33 is dispatched and the position at which the ball 33 arrives based on the second power property and the rotational property. If the control unit 1 identifies the ball release request from the operation input unit 5, the second power property and the rotational property of the ball 33 are read out of the memory unit 2 and set to the ball 33. Then, the ball 33 is dispatched from the pitcher character 30. Accordingly, the control unit 1 computes the trajectory of the ball 33 based on the trajectory change rate data, the rotational direction data 70, and the rotational velocity data 71, and the trajectory setting means 56 sets the trajectory of the ball 33 between the position from which the ball 33 is dispatched and the position at which the ball 33 arrives.

The passage position moving means 57 is a means for achieving the function of moving the estimated passage position in the estimated passage display area in accordance with the position of the ball 33 in the ball trajectory. The passage position moving means 57 in the control unit 1 moves the estimated passage position 60 in the estimated passage area (e.g., the hitting area 40) in accordance with the position of the ball 33 in the ball trajectory controlled by the control unit 1. Here, the control unit 1 computes the position coordinate of the ball 33 located in the ball trajectory. Then, an intersection coordinate in which a tangent line tangent to the trajectory of the ball 33 in the position coordinate of the ball 33 intersects with the hitting area 40 is computed. The control unit 1 sets this intersection coordinate to the hitting area 40 as the estimated passage position 60. With the position coordinate of the ball 33 changing, the control unit 1 recomputes the estimated passage position 60 set herewith for adjustment, and the adjusted estimated passage position 60 is reconfigured to the hitting area 40. Thus, the estimated passage position 60 is moved in the hitting area 40.

The rotational status display means 58 is a means for achieving the function of continuously displaying the rotational status of the ball, defined based on the rotational property, in the estimated passage position that can be moved in the estimated passage display area. This rotational status display means 58 achieves the function of displaying the rotating and changing status of the ball 33 by continuously piecing together a plurality of time-series image data of the ball. The rotational status display means 58 in the control unit 1 sets the rotational status of the ball to the ball 33 based on the rotational property. Then, if the control unit 1 sets the rotational status to the ball, the control unit 1 issues the rotation display demand to the image display unit 3, and a rotation mark 62 that corresponds to the rotational status is continuously displayed in the estimated passage display area (e.g., the estimated passage position 60 in the hitting area 40) in the television monitor 20. Here, the control unit 1 reads out a plurality of time-series image data 80, 81, 82, 90, 91, and 92 of the ball 33 from the memory unit 2, and continuously pieces them together (see FIG. 13). Then, the control unit 1 provides the continuously pieced time-series image data 80, 81, 82, 90, 91, and 92 for the image display unit 3. Because of this, the rotating and changing status of the ball 33 is displayed as motion pictures in the television monitor 20.

Method for Executing Various Functions of the Video Game

Figure 3:
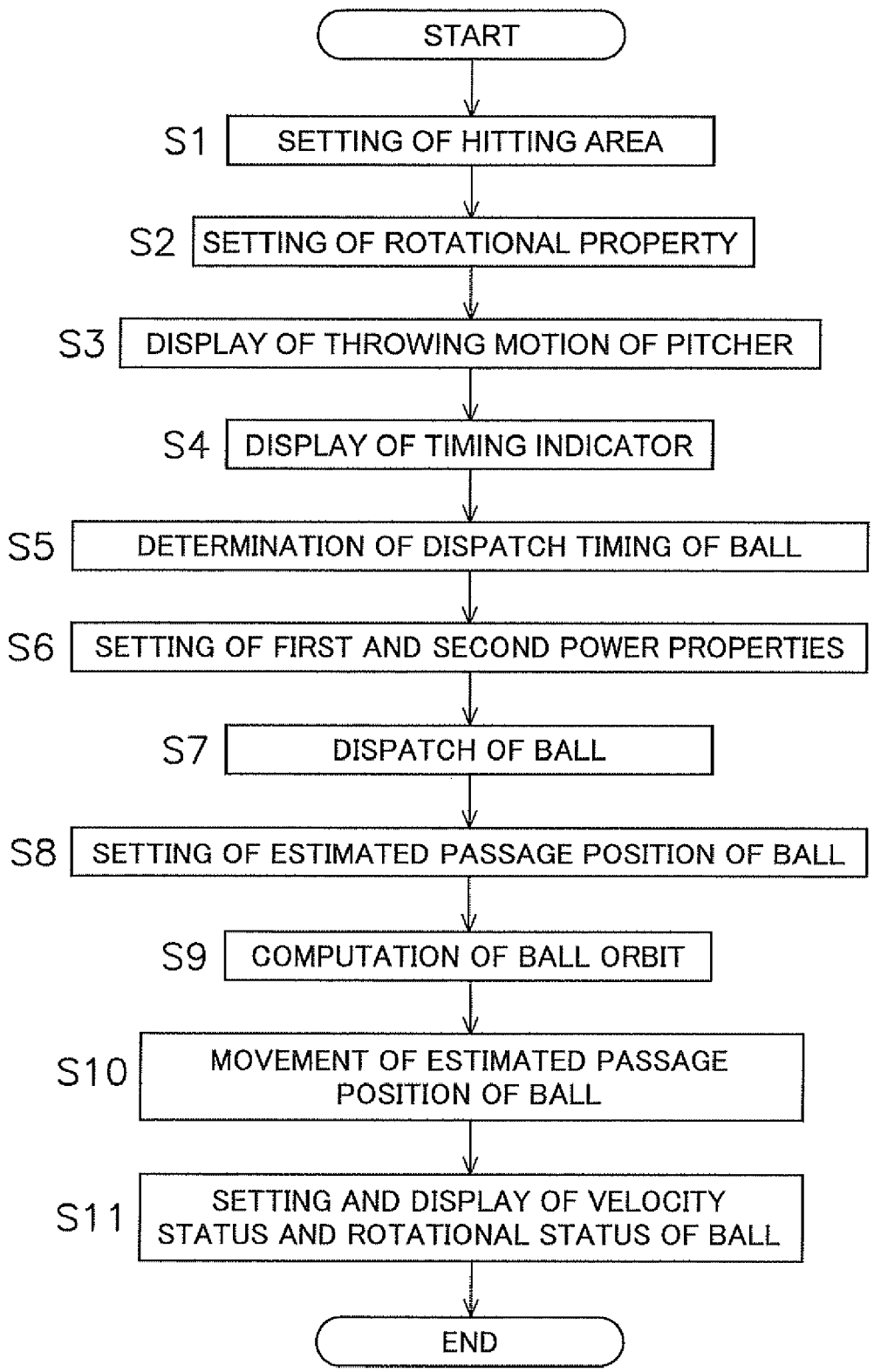
FIG. 3 is a flow chart showing the configuration and display of the velocity status and the rotational status of a ball.

First, the general execution of various functions of the baseball video game in accordance with the present invention will be described with reference to a flow chart shown in FIG. 3.

In a baseball video game having a primary characteristic in which the pitcher character 30, the catcher character 31, the batter character 32, and the ball 33 are displayed in the television monitor 20, and the ball 33 is dispatched from the pitcher character 30 through the operation of the controller 17, the control unit 1 sets the hitting area 40 to be positioned above the home plate 35 and between the position from which the ball 33 is dispatched and the position at which the ball arrives in a passage area setting step (Step S1). First, the rotational property instruction request is provided to the pitcher character 30 through the controller 17, and accordingly the rotational property is set to the ball 33 which is dispatched from the pitcher character 30 in a rotational property setting step (Step S2). Next, a motion start demand is given to the pitcher character 30 through the controller 17, and accordingly the pitcher character 30 will start a throwing motion. Accordingly, the throwing motion of the pitcher character 30 is displayed in the television monitor 20 (Step S3). Here, a timing indicator 42 indicating the timing at which the pitcher character 30 throws the ball is displayed in front of the catcher character 31 (Step S4). If the pitcher character 30 receives a request to throw the ball through the controller 17 in this state, the timing at which the pitcher character 30 throws the ball is determined (Step S5). Here, the first and the second power properties are set to the ball 33 in accordance with the timing at which the ball 33 is dispatched from the pitcher character 30 in the first and second power property setting step (Step S6). Then, the ball 33 is dispatched from the pitcher character 30 to the catcher character 31 (Step S7). If the ball 33 is dispatched from the pitcher character 30, the estimated passage position 60 of the ball 33 is set to the hitting area 40 in a passage position setting step (Step S8). Then, the control unit 1 sets the trajectory of the ball 33 that is dispatched from the pitcher character 30 between the position from which the ball 33 is dispatched and the position at which the ball 33 arrives based on the second power property and the rotational property in a trajectory setting step (Step S9). Furthermore, the control unit 1 controls and moves the estimated passage position 60 of the ball 33 in the hitting area 40 in accordance with the position of the ball 33 in the ball trajectory in a passage position moving step (Step S10). Then, the velocity mark 61 that corresponds to the velocity of the ball 33 and the rotation mark 62 that corresponds to the rotational status thereof are displayed in the estimated passage position 60 that is moved in the hitting area 40 in the television monitor 20 based on the first power property and the rotational property in a power status display step and a rotational status display step (Step S11).

General Execution of the Video Game

A situation in which a baseball video game with the above described various functions is executed will be described with reference to screen shots displayed in the television monitor 20.

Figure 4:
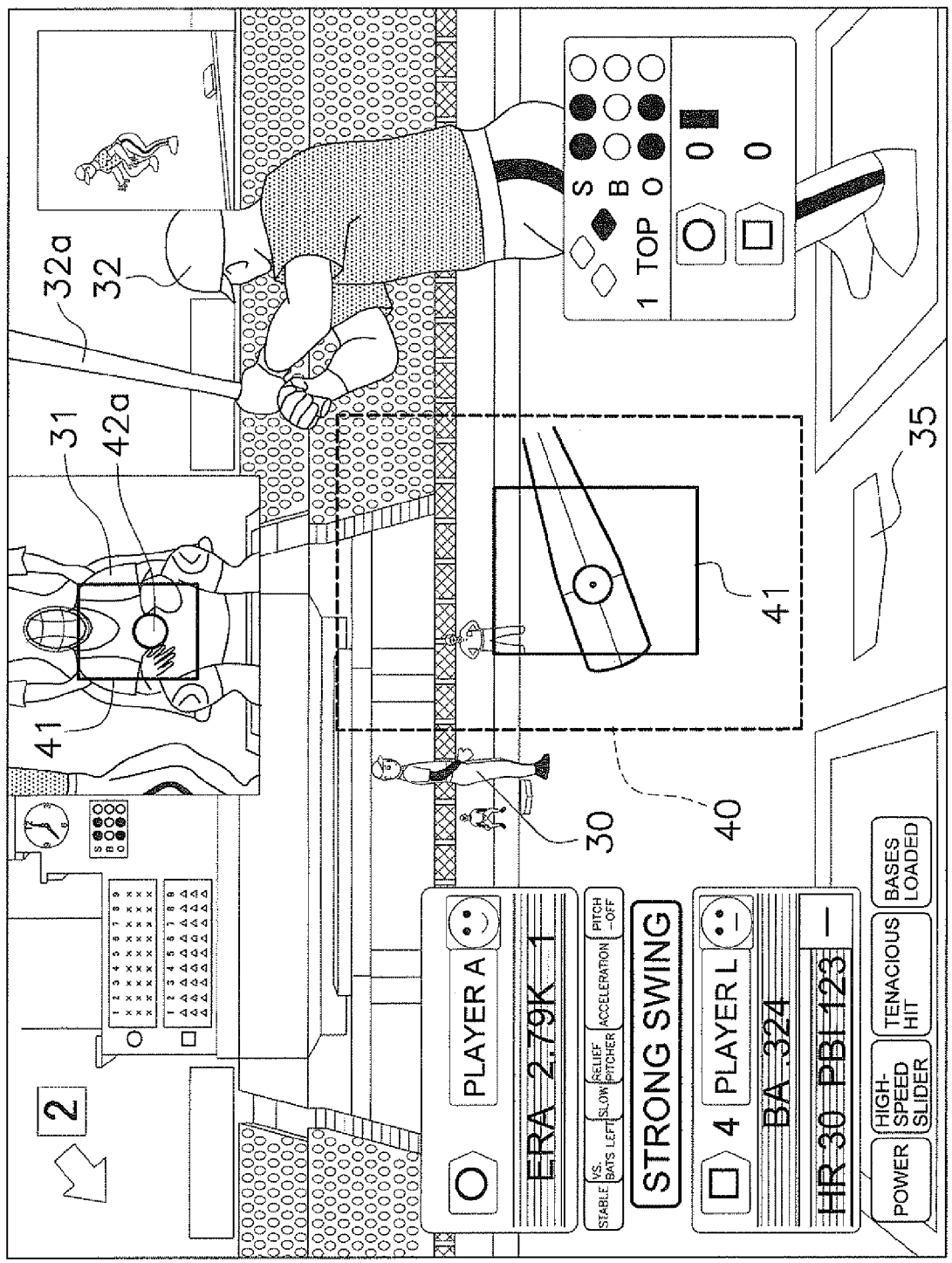
FIG. 4 is a screen shot displayed on a television monitor during execution of a game (before a pitcher character starts a throwing motion: an optimal release).
Figure 6:
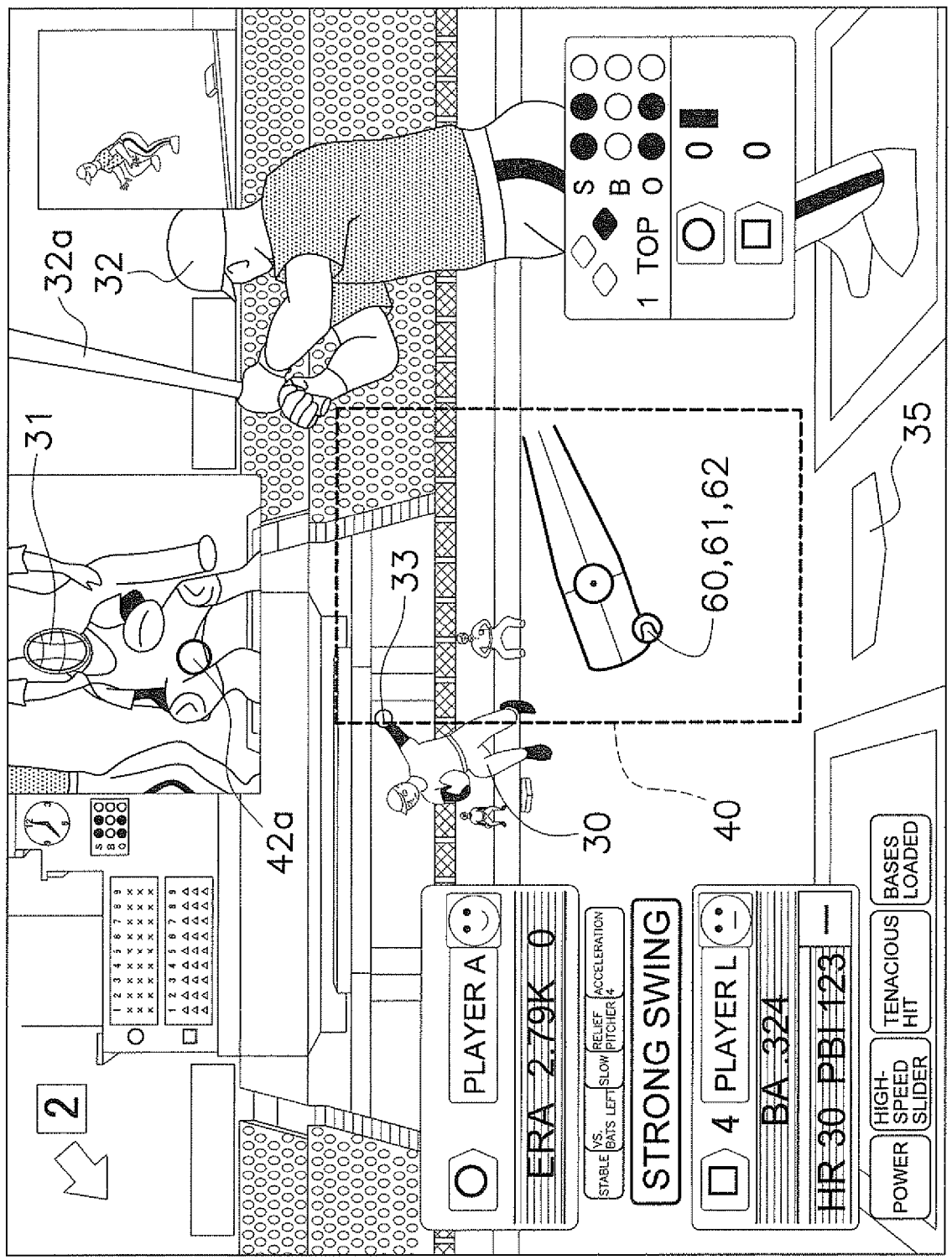
FIG. 6 is a screen shot displayed on a television monitor during execution of a game (when a pitcher character releases the ball: an optimal release).
Figure 7:
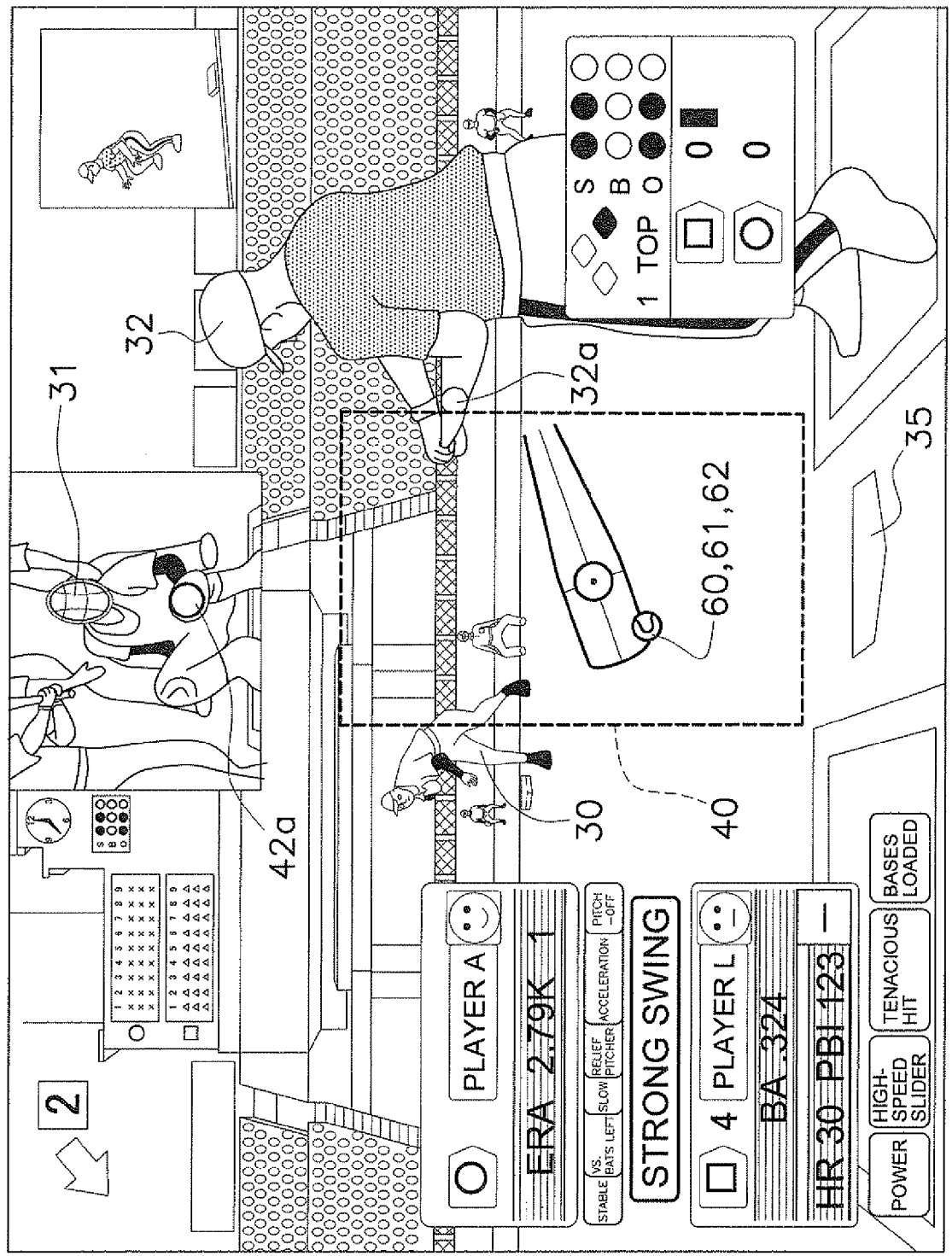
FIG. 7 is a screen shot displayed on a television monitor during execution of a game (when a pitcher character releases the ball: an optimal release).
Figure 8:
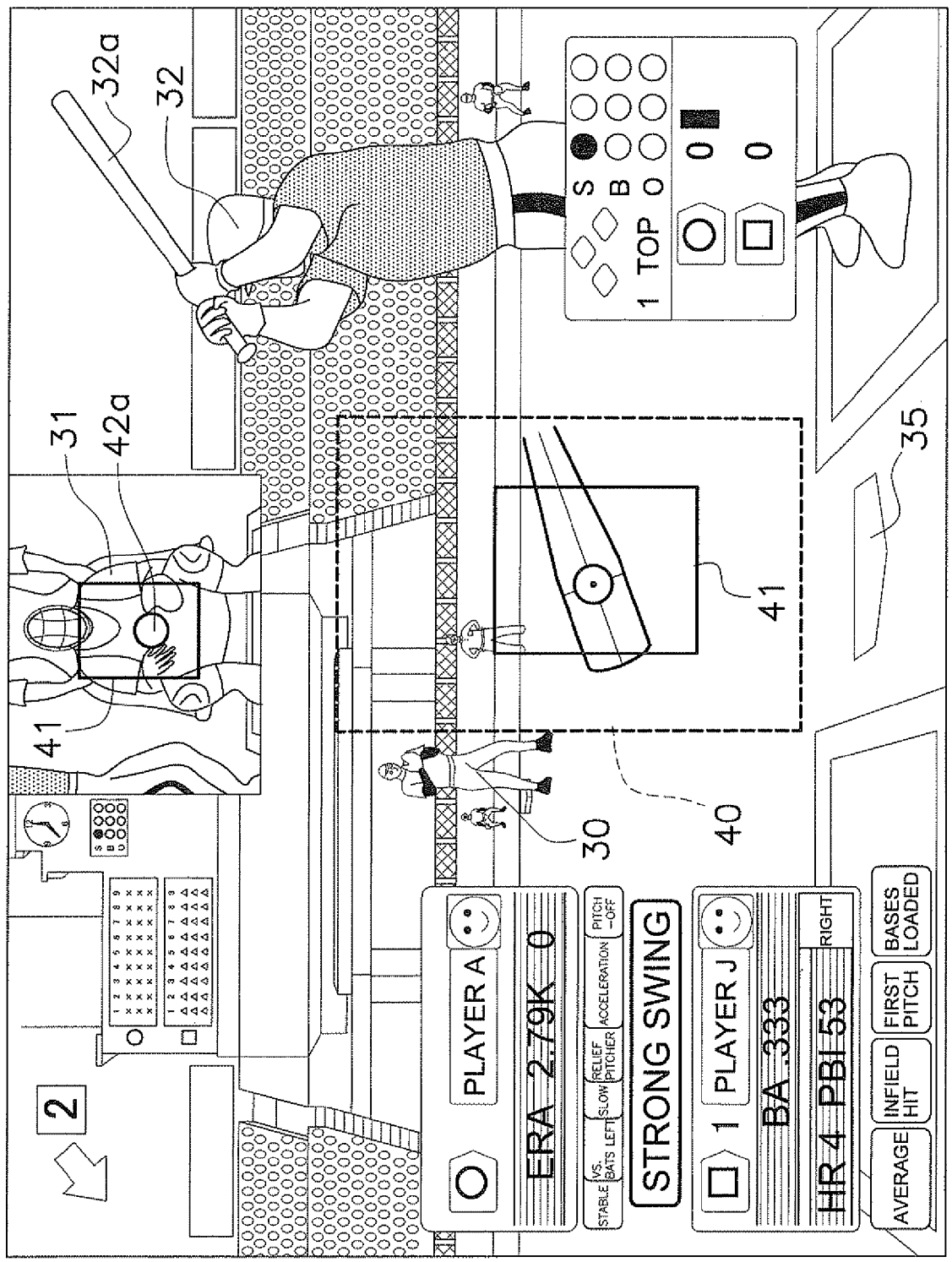
FIG. 8 is a screen shot displayed on a television monitor during execution of a game (before a pitcher character starts a throwing motion: a bad pitch).

For example, as shown in FIGS. 4 to 11, the pitcher character 30, the catcher character 31, the batter character 32, and the ball 33 are primarily displayed in the screen of the television monitor 20. The pitcher character 30 is displayed in approximately the center of the screen. The catcher character 31 is displayed in the upper portion of the screen. The batter character 32 is displayed in the right portion of the screen. As shown in FIGS. 4 and 8, the strike zone 41 is displayed above the home plate 35 and in front of the catcher character 31. Here, FIGS. 4 and 8 are screen shots showing the state before the pitcher character 30 dispatches the ball 33.

If the video game player presses the up key 17U, the down key 17D, the left key 17L, and the right key 17R of the controller 17, the type of pitch the pitcher character 30 will throw will be determined. Various keys and buttons of the controller 17 will be pressed, and the rotational property will be set to the ball 33 that is dispatched from the pitcher character 30. For example, a four-seam fastball, a forkball, a slider, a shootball, and the like are allocated to the up key 17U, the down key 17D, the left key 17L, and the right key 17R, respectively.

Figure 5:
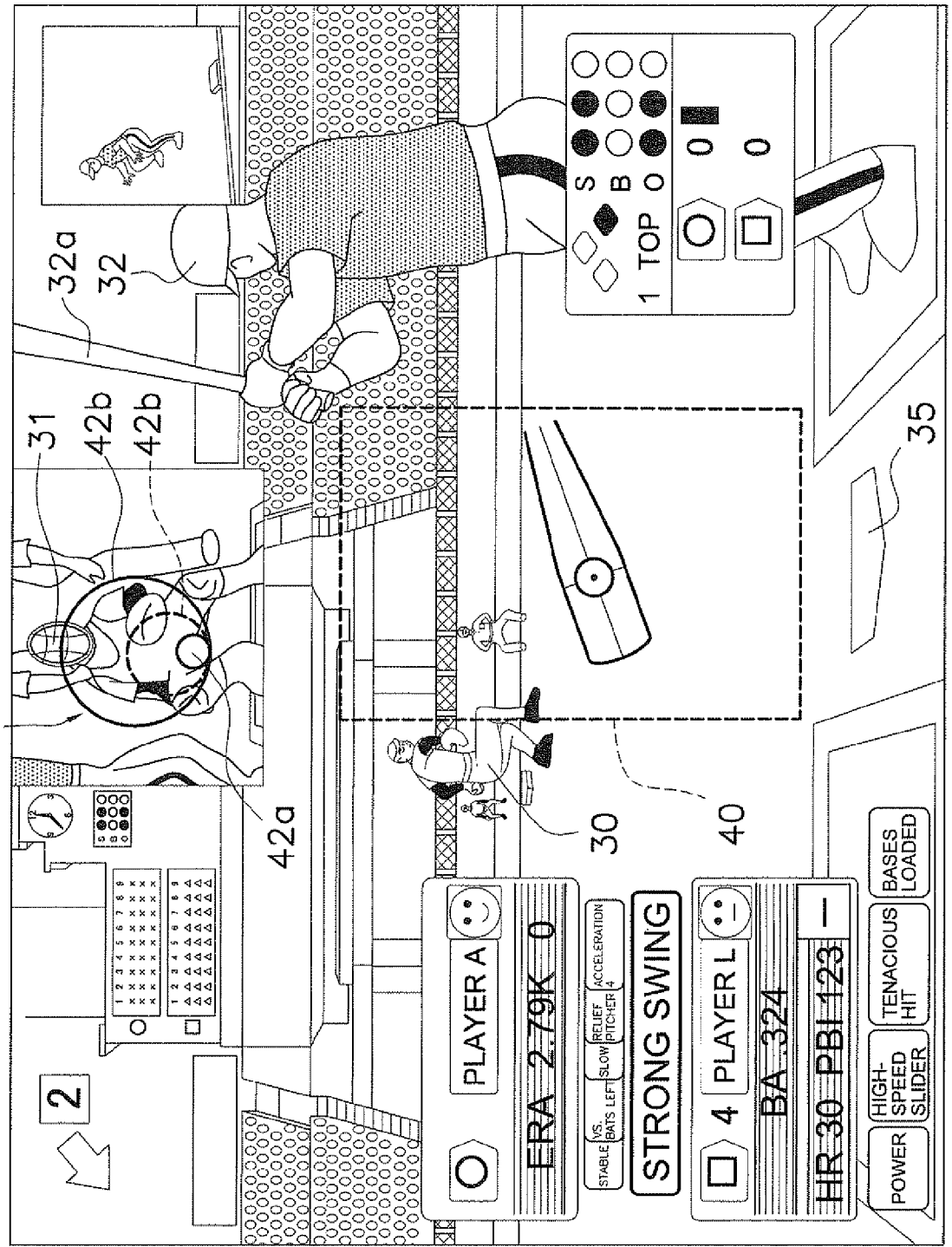
FIG. 5 is a screen shot displayed on a television monitor during execution of a game (after a pitcher character has started a throwing motion: an optimal release).
Figure 9:
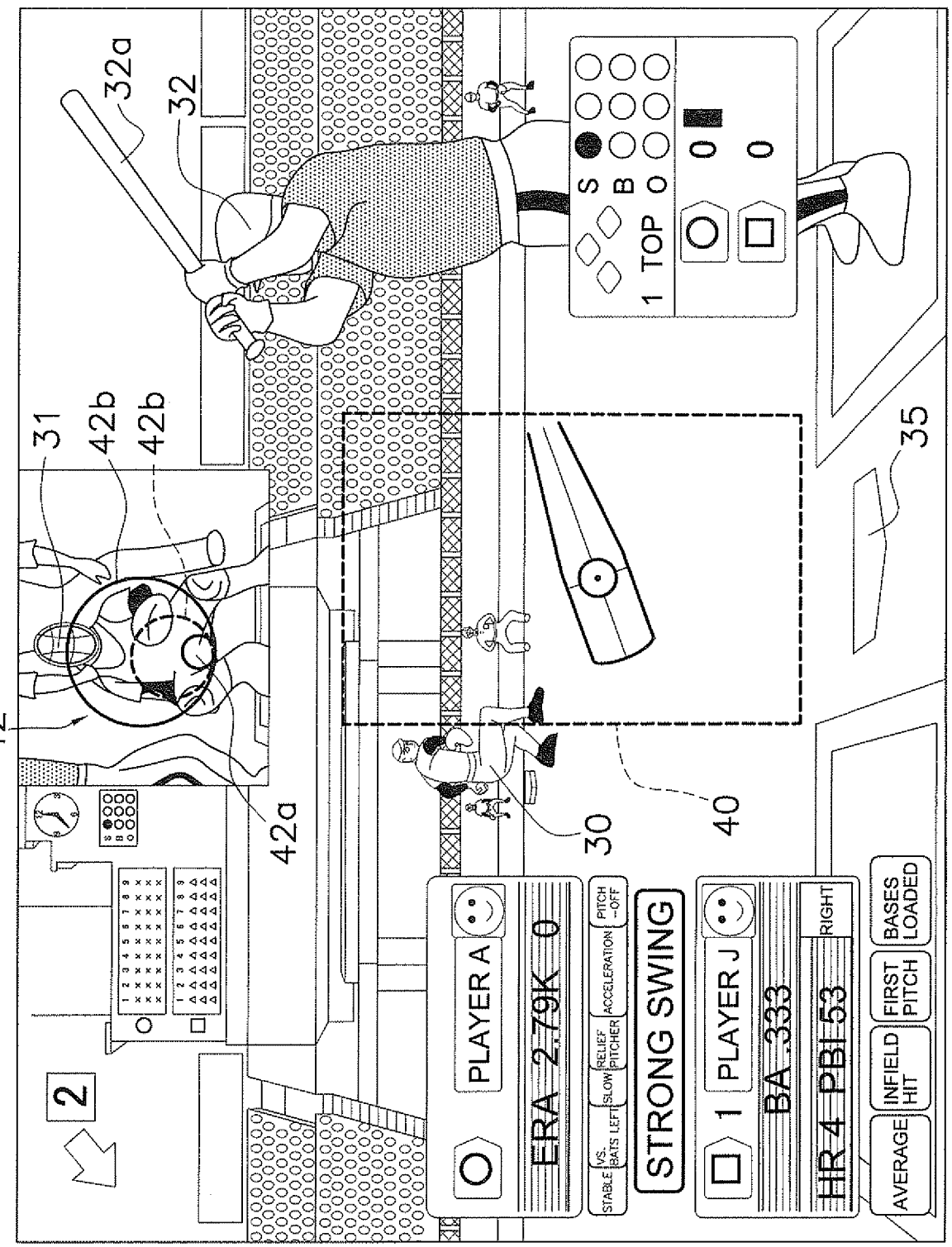
FIG. 9 is a screen shot displayed on a television monitor during execution of a game (before a pitcher character starts a throwing motion: a bad pitch).
Figure 10:
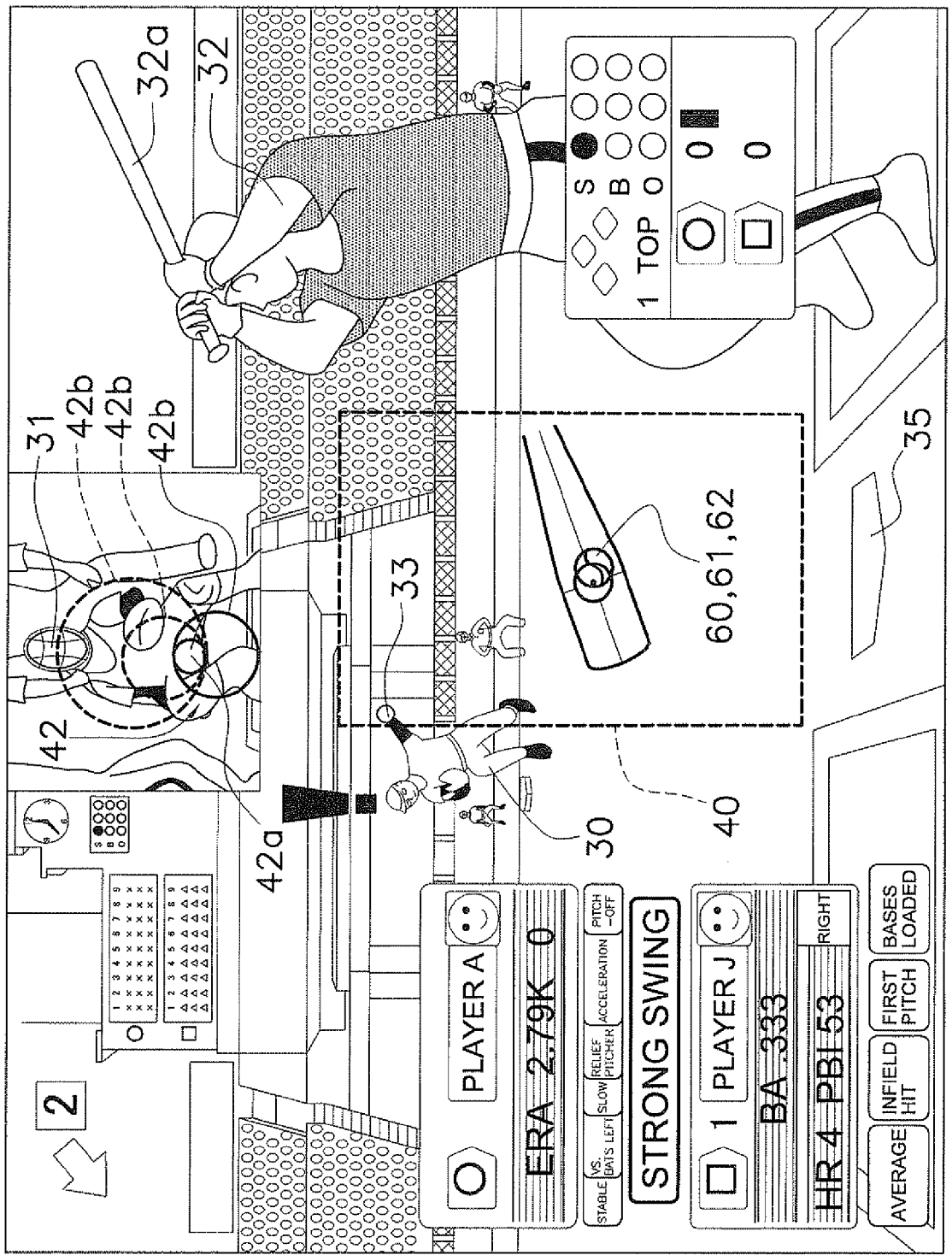
FIG. 10 is a screen shot displayed on a television monitor during execution of a game (when a pitcher character releases the ball: a bad pitch).

If the third button 17c of the controller 17 is pressed by the video game player, the pitcher character 30 starts a throwing motion as shown in FIGS. 5 and 9. Here, the timing indicator 42 is displayed in the position of the mitt of the catcher character 31. The timing indicator 42 functions as an indicator for determining the timing at which the pitcher character 30 releases the ball. This timing indicator 42 is comprised of a circular course marking 42a that indicates the course position of the ball when the pitcher character 30 throws the ball to the catcher character 31, and the timing display ring 42b that is formed to surround the course marking 42a. If the pitcher character 30 starts a throwing motion, the timing display ring 42b gradually gets smaller towards the course marking 42a. Then, as shown in FIG. 6, if the second button 17b of the controller 17 is pressed when the timing display ring 42b overlaps with the course marking 42a, it is possible to command the pitcher character 30 to release the ball at an optimal release point. Then, after the pitcher character 30 releases the ball, the course marking will move in association with the positional change of the ball 33 in the ball trajectory. However, if the second button 17b of the controller 17 is pressed before the timing display ring 42b overlaps with the course marking 42a or when the timing display ring 42b becomes larger again in a direction opposite to the overlapping direction after it overlaps with the course marking 42a (see FIG. 10), the pitcher character 30 will release the ball at a point misaligned with the optimal release point. Then, after the pitcher character 30 releases the ball, the course marking will move in association with the positional change of the ball 33 in the ball trajectory. Here, if the video game player can command the pitcher character 30 to release the ball at the optimal release point, the first power property with a small deceleration and the second power property with a large trajectory change rate are set to the ball 33. In other words, a ball property with high velocity and high-speed rotation is set to the ball 33. However, if the video game player commands the pitcher character 30 to release the ball at a point misaligned with the optimal release point, the first power property with a large deceleration and the second power property with a small trajectory change rate are set to the ball 33. In other words, a property with lower velocity and lower-speed rotation is set to the ball 33 in accordance with the distance that the release point is misaligned with the course marking 42a. Thus, the first and the second power properties are set to the ball 33 in accordance with the timing at which the ball 33 is dispatched from the pitcher character 30. Note that the trajectory of the ball 33 changes in the vicinity of the batter character 32 if the trajectory change rate is large, whereas the trajectory of the ball 33 starts changing in a position remote from the batter character 32 if the trajectory change rate is small.

In addition, the quality of control over the ball that is dispatched from the pitcher character 30 is determined by whether or not the video game player can command the pitcher character 30 to release the ball at the optimal release point. If the video game player can command the pitcher character 30 to release the ball at the optimal release point, the video game player can command the pitcher character 30 to release a well-controlled ball. However, if the video game player commands the pitcher character 30 to release the ball at a point misaligned with the optimal release point, the video game player will command the pitcher character 30 to release a ball that is not controlled well. In other words, a video game player will tend to command the pitcher character 30 to release the ball that is not controlled well in accordance with the distance that the release point is misaligned with the course marking 42a. Thus, the ball control of the pitcher character 30 is determined in accordance with the timing at which the ball 33 is dispatched from the pitcher character 30.

If the ball 33 is dispatched from the pitcher character 30 to the catcher character 31, the trajectory of the ball 33 that is dispatched from the pitcher character 30 is set between the position from which the ball 33 is dispatched and the position at which the ball 33 arrives based on the second power property and the rotational property. Here, the velocity mark 61 that corresponds to the velocity status (power status) of the ball in the hitting area 40 and the rotation mark 62 that corresponds to the rotational status are displayed in the estimated passage position 60 in the hitting area 40 on the screen of the television monitor based on the first power property and the rotational property. Then, the condition in which the velocity mark 61 corresponding to the velocity status of the ball and the rotation mark 62 corresponding to the rotational status moves with the estimated passage position 60 in the hitting area 40 in association with the movement of the ball 33 in the trajectory will be displayed on the screen of the television monitor. Here, as shown in FIGS. 5 to 7 and FIGS. 9 to 11, the strike zone 41 that had been displayed in the hitting area 40 will have disappeared from the screen of the television monitor. Note that the hitting area 40 is not displayed in the actual video game, and it is shown with a dotted line in FIGS. 4 to 11 in the present application for the purpose of explaining the hitting area 40.

Figure 11:
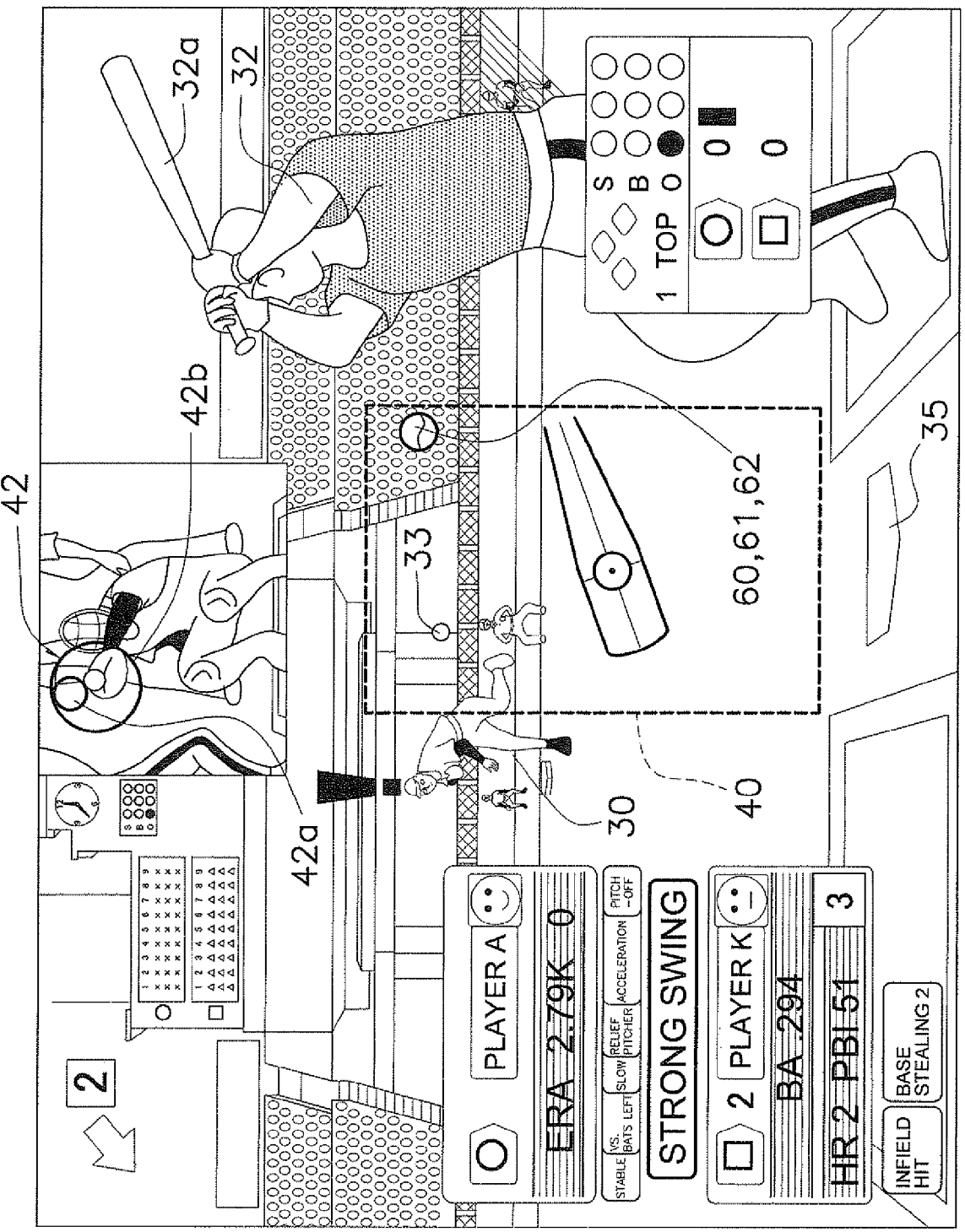
FIG. 11 is a screen shot displayed on a television monitor during execution of a game (after a pitcher character has released the ball: a bad pitch).

The velocity status of the ball is determined based on the first power property of the ball 33 that is set in accordance with the timing at which the ball 33 is dispatched from the pitcher character 30. Here, the velocity status of the ball is determined based on the deceleration. The deceleration data for setting deceleration is stored in the memory unit 2, and the ball 33 is decelerated between the position from which the ball 33 is dispatched and the position at which the ball 33 arrives based on this deceleration data. As shown in FIGS. 7 and 11, the velocity mark 61 that corresponds to the velocity status of the ball is displayed by means of the size difference of the ball in the hitting area. For example, the ball in the hitting area will be displayed with a small size in the estimated passage position 60 (see FIG. 7) if deceleration thereof is small, that is, if the ball has a high velocity, whereas the ball in the hitting area will be displayed with a large size in the estimated passage position 60 if deceleration thereof is large, that is, if the ball has a low velocity (see FIG. 11). Thus, the velocity mark 61 that corresponds to the velocity status of the ball, which is expressed with the size difference in the estimated passage position 60, moves in the hitting area 40 with the estimated passage position 60 of the ball. Note that the display of the ball in the hitting area with a small size in the estimated passage position 60 indicates that the ball has a high-speed rotation as well as high velocity, and the ball 33 will change trajectory in the vicinity of the batter character 32. The display of the ball in the hitting area with a large size in the estimated passage position 60 will indicate that the ball has neither high velocity nor a high speed rotation, and the ball 33 will start changing trajectory in a position remote from the batter character 32.

Figure 12:
FIG. 12 shows rotational direction data, rotational velocity data, and pattern data in accordance with the type of pitch.
Figure 13:
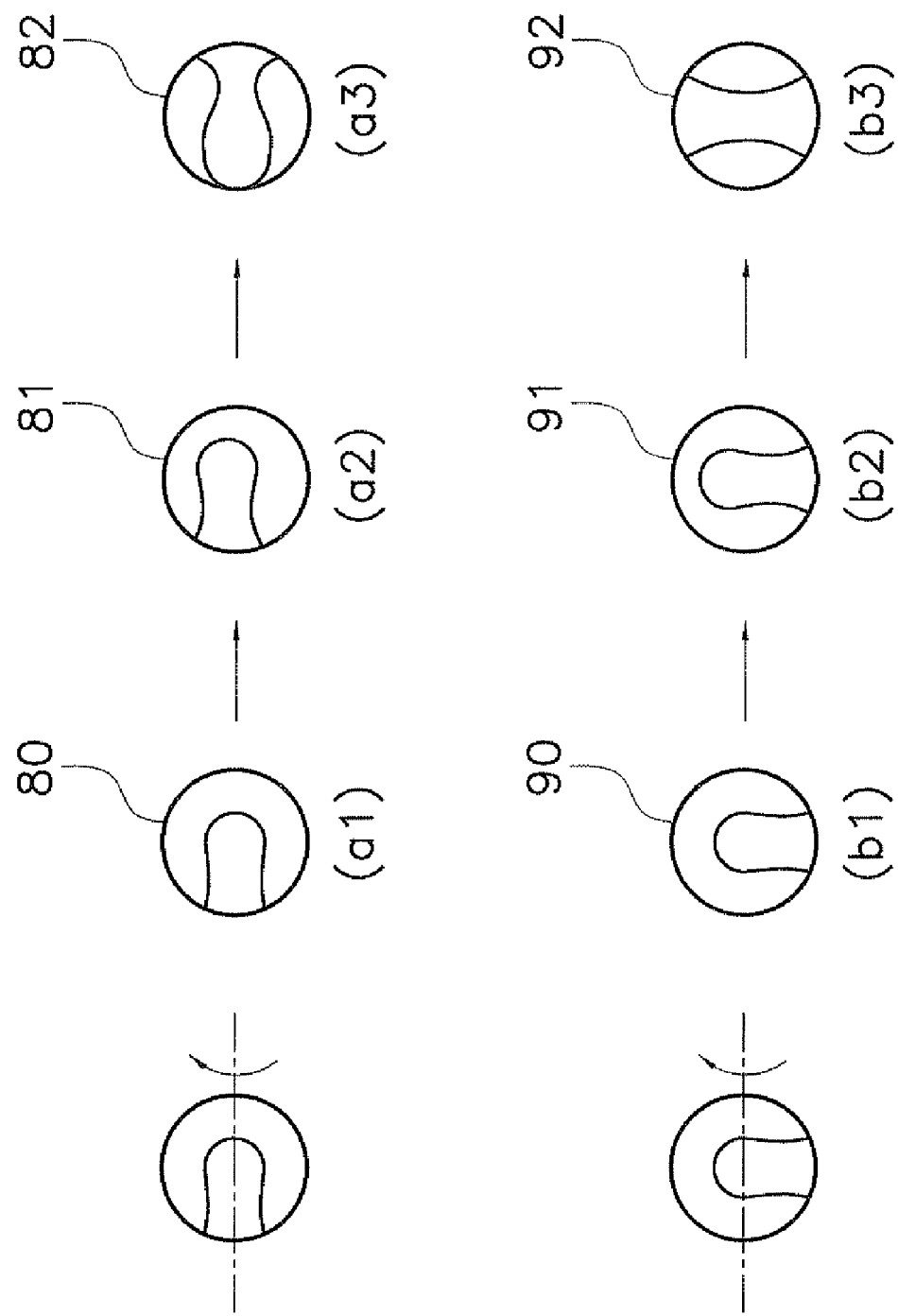
FIG. 13 is an example of time-series image data for expressing the rotational status of a ball.

As shown in FIG. 12, the rotational status of the ball is determined based on the rotational direction data 70 and the rotational velocity data 71 of the ball 33, which correspond to the type of pitch thrown. Here, the rotational direction data 70 and the rotational velocity data 71 of the ball 33 are stored in the memory unit 2. As shown in FIG. 13, the rotation mark 62 that corresponds to the rotational status of the ball is expressed as a motion picture by continuously piecing together a plurality of two-dimensional time-series image data 80, 81, 82, 90, 91, and 92 of the ball. Pattern data 72 for four-seam and two-seam balls are prepared for the plurality of two-dimensional time-series image data 80, 81, 82, 90, 91, and 92 (see FIG. 12). The rotational direction is set to the plurality of two-dimensional time-series image data 80, 81, 82, 90, 91, and 92 based on the rotational direction data 70 of the ball, whereas the rotational velocity is set to the plurality of two-dimensional time-series image data 80, 81, 82, 90, 91, and 92 based on the rotational velocity data 71 of the ball. For example, if the type of pitch is a four-seam fastball, a plurality of four-seam image data 80, 81, and 82 shown in FIGS. 13 (a1) to 13 (a3) are used. Then, a condition indicating that the ball 33 rotates in the upward direction is expressed as a motion picture by continuously piecing the four-seam image data 80, 81, and 82 sequentially from FIG. 13 (a1) to FIG. 13 (a3). Here, a condition indicating that the ball 33 rotates in the upward direction at a high speed is expressed as a motion picture by setting the time interval in which the image data 80, 81, and 82 are pieced together to be shorter. If the type of pitch is a slider, a condition in which the ball 33 rotates in the left direction at a high speed is expressed as a motion picture (see FIG. 12) in the same way. For example, if the type of pitch is palmball, a plurality of two-seam image data 90, 91, and 92 shown in FIGS. 13 (b1) to 13 (b3) are used. Then, a condition that the ball 33 rotates in the upper direction is displayed as a motion picture by continuously piecing the two-seam image data 90, 91, and 92 sequentially from FIG. 13 (b1) to FIG. 13 (b3). Here, a condition indicating that the ball 33 rotates in the upper direction at a low speed is displayed as a motion picture by setting the time interval in which the image data 90, 91, and 92 are pieced together to be longer. If the type of pitch is a changeup, a condition in which the ball 33 rotates in the upward direction at a moderate speed is displayed as a motion picture (see FIG. 12) in the same way. Thus the rotation mark 62 that corresponds to the rotational status of the ball displayed in the estimated passage position 60 is displayed and moves in the hitting area 40 in accordance with the movement of the estimated passage position 60 of the ball.

In the present embodiment, the rotational status of a ball defined based on the rotational property thereof will be continuously displayed in the estimated passage position 60 moved within the hitting are 40. Because of this, the video game player can predict the direction in which the ball in the hitting area 40 will move in advance by watching the rotational status of the ball, which is continuously displayed in the estimated passage position 60. In other words, the video game player will easily predict the direction in which the ball in the hitting area 40 will move in advance by means of the estimated passage position 60 in the hitting area 40. In addition, the velocity property is set to the ball 33, and the power status 61 of the ball, which is defined based on the power property, is configured to be displayed in the estimated passage position 60 in the hitting area 40. Because of this, the video game player can grasp the power of the ball in advance by watching the power status 61 of the ball, which is defined based on the power property. In other words, the video game player can grasp the power of the ball 33 by the information regarding the estimated passage position 60 in the hitting area 40.

OTHER EMBODIMENTS (a) In the above described embodiment, a situation was described in which the game device of the present invention is applied to a home video game device. However, the game device is not limited to the above described embodiment and can be applied to a monitor-integrated arcade game device, a personal computer that functions as a game device when a game program is executed therein, a workstation, and the like as well.

(b) In the above described embodiment, a situation was described in which a baseball video game was used in the game device of the present invention. However, the game is not limited to the above described embodiment, and can be any type of game in which a moving object that can express the rotational status and the power status thereof is used.

(c) In the above described embodiment, a situation was described in which the hitting area 40 (i.e., the estimated passage display area) is set to be a rectangle shape. However, the shape of the hitting area 40 is not limited to the above described embodiment, and can be set to an arbitrary shape.

(d) The present invention includes a program for executing the above described method and a computer-readable storage medium in which this program is recorded. For example, a computer-readable flexible disk, a semiconductor memory, a CD-ROM, a DVD, a MO, a ROM cassette, and the like can be used as the storage medium.

INDUSTRIAL APPLICABILITY

In the present invention, the rotational status of a moving object defined based on the rotational property thereof will be continuously displayed in an estimated passage position which is moved in an estimated passage display area. Because of this, a video game player can predict the direction in which the moving object will move in advance by watching the rotational status of the moving object continuously displayed in the estimated passage position. In other words, it will be easier for the video game player to predict the direction in which the moving object will move in advance by means of the estimated passage position in the estimated passage display area. In addition, the power property of the moving object will be set, and the power status of the moving object which is defined based on the power property will be displayed in the estimated passage position in the estimated passage display area. Accordingly, the video game player can grasp the power of the moving object in advance by watching the power status of the moving object which is defined based on the power property. In other words, the video game player can grasp the power of the moving object by means of the estimated passage position in the estimated passage display area The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A game program stored on a non-transitory computer-readable storage, the game program causing a computer to execute a game in which a first character, a second character which has the first character as opponent and a moving object are displayed on a monitor, and the moving object is dispatched from the first character by operating a controller, the game program comprising:

a passage area setting function configured to set an estimated passage display area of the moving object in a predetermined position between the position from which the moving object is dispatched and the position at which the moving object arrives, the estimated passage display area being immovable before the moving object is dispatched from the first character;

a passage position setting function configured to set an estimated passage position of the moving object in the estimated passage display area;

a first power property setting function configured to set a first power property to the moving object in accordance with the timing at which the moving object is dispatched from the first character;

a rotational property setting function configured to set a rotational property of the moving object which is dispatched from the first character;

a trajectory setting function configured to set the trajectory of the moving object which passes nearby the second character between the position from which the moving object is dispatched and the position at which the moving object arrives based on the rotational property;

a passage position moving function configured to move the estimated passage position in the estimated passage display area by directly projecting the position of the moving object which is in motion on the trajectory between the position from which the moving object is dispatched and the position at which the moving object arrives based on the rotational property to the estimated passage display area;

a rotational status display function configured to continuously display the rotational status of the moving object, which is defined based on the rotational property, in the estimated passage position which is moved in the estimated passage display area, by using image data of the ball in a memory unit to inform a operator of the second character of the rotational status of the moving object which is dispatched from the first character; and a power status display function configured to express a power status of the moving object with the size of the moving object and display the power status, which is defined based on the first power property, in the estimated passage position in the estimated passage display area to inform the operator of the power status of the moving object which is dispatched from the first character.

2. The game program according to claim 1, wherein
the rotational property comprises at least either of the rotational direction of the moving object and the rotational velocity of the moving object.

3. The game program according to claim 1, wherein
the rotational status display function displays the moving object changing the trajectory by rotating, by continuously piecing together a plurality of time-series image data of the moving object.

4. The game program according to claim 1, wherein
the first power property comprises the acceleration of the moving object between the position from which the moving object is dispatched and the position at which the moving object arrives.

5. The game program according to claim 1, further comprising
a rotational property setting function configured to set a rotational property to the moving object which is dispatched from the first character;

a second power property setting function configured to set a second power property to the moving object in accordance with the timing at which the moving object is dispatched from the first character;

a trajectory setting function configured to set the trajectory of the moving object between the position from which the moving object is dispatched and the position at which the moving object arrives based on the second power property and the rotational property;

a passage position moving function configured to move the estimated passage position in the estimated passage display area in accordance with the position of the moving object in the trajectory; and a rotational status display function configured to continuously display the rotational status of the moving object, which is defined based on the rotational property, in the estimated passage position that is moved in the estimated passage display area.

6. The game program according to claim 5, wherein
the rotational property comprises at least either of a rotational direction of the moving object and a rotational velocity of the moving object.

7. The game program according to claim 5, wherein
the second power property includes a trajectory change rate which indicates the extent to which the trajectory of the moving object has changed.

8. The game program according to claim 5, wherein
the rotational status display function displays the moving object changing the trajectory by rotating, by continuously piecing together a plurality of time-series image data of the moving object.

9. A game method in which a first character, a second character which has the first character as opponent, and a moving object are displayed on a monitor, and the moving object is dispatched from the first character by operating a controller, the game method comprising the steps of:

setting an estimated passage display area of the moving object in a predetermined position between the position from which the moving object is dispatched and the position at which the moving object arrives;

setting an estimated passage position of the moving object in the estimated passage display area, the estimated passage display area being immovable before the moving object is dispatched from the first character;

setting a first power property to the moving object in accordance with the timing at which the moving object is dispatched from the first character;

setting a rotational property of the moving object which is dispatched from the first character;

setting a trajectory of the moving object which passes nearby the second character between the position from which the moving object is dispatched and the position at which the moving object arrives based on the rotational property;

moving the estimated passage position in the estimated passage display area by directly projecting the position of the moving object which is in motion on the trajectory between the position form which the moving object is dispatched and the position at which the moving object arrives based on the rotational property to the estimated passage display area;

continuously displaying a rotational status of the moving object, which is defined based on the rotational property, in the estimated passage position that is moved in the estimated passage display area, by using image data of the ball in a memory unit to inform an operator of the second character of the rotational status of the moving object which is dispatched from the first character; and expressing a power status of the moving object with the size of the moving object and display the power status, which is defined based on the first power property, in the estimated passage position in the estimated passage display area to inform the operator of the power status of the moving object which is dispatched from the first character.

* * * * *